US009628007B2

United States Patent
Kimura et al.

(10) Patent No.: US 9,628,007 B2
(45) Date of Patent: Apr. 18, 2017

(54) POWER GENERATOR WITH LOAD-DUMP PROTECTION

(71) Applicant: DENSO CORPORATION, Kariya, Aichi-pref (JP)

(72) Inventors: Asaka Kimura, Kariya (JP); Takatoshi Inokuchi, Kariya (JP); Masaya Nakanishi, Kariya (JP); Toshinori Maruyama, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 14/922,593

(22) Filed: Oct. 26, 2015

(65) Prior Publication Data

US 2016/0118920 A1 Apr. 28, 2016

(30) Foreign Application Priority Data

Oct. 27, 2014 (JP) .................. 2014-217971

(51) Int. Cl.
| | |
|---|---|
| H02P 9/10 | (2006.01) |
| H02P 9/14 | (2006.01) |
| H02P 9/00 | (2006.01) |
| H02P 29/024 | (2016.01) |
| H02P 11/00 | (2006.01) |
| H02H 7/06 | (2006.01) |

(52) U.S. Cl.
CPC .......... *H02P 9/006* (2013.01); *H02P 29/0241* (2016.02)

(58) Field of Classification Search
USPC ............................................. 322/21, 28, 77
See application file for complete search history.

(56) References Cited

U.S. PATENT DOCUMENTS

| | | | | |
|---|---|---|---|---|
| 5,748,463 A | * | 5/1998 | Tsutsui .................... | H02J 7/242 322/28 |
| 5,793,167 A | * | 8/1998 | Liang ....................... | H02P 9/48 318/141 |
| 6,803,746 B2 | * | 10/2004 | Aker ........................ | H02J 7/0042 320/139 |
| 6,982,539 B1 | * | 1/2006 | Ward ....................... | H02P 1/445 318/778 |
| 7,081,738 B2 | * | 7/2006 | Muramatsu ....... | H02M 7/53871 322/24 |
| 7,301,308 B2 | * | 11/2007 | Aker ........................ | H02J 7/0042 320/139 |
| 7,315,149 B2 | * | 1/2008 | Kizawa .................... | H02P 9/48 322/19 |

(Continued)

FOREIGN PATENT DOCUMENTS

| | | |
|---|---|---|
| JP | 2011-507468 A | 3/2011 |
| JP | 2011-244669 A | 12/2011 |

(Continued)

*Primary Examiner* — Pedro J Cuevas
(74) *Attorney, Agent, or Firm* — Oliff PLC

(57) ABSTRACT

In a power generator, a determiner determines whether a phase voltage output from each of multiphase armature windings has exceeded a threshold voltage. A turn-on unit turns on at least one of the protective switches as a target protective switch to limit the output voltage of the rectifier circuit to be lower than the threshold voltage upon the phase voltage output from at least one of the multiphase armature windings corresponding to the at least one of the protective switches has exceeded the threshold voltage.

9 Claims, 9 Drawing Sheets

(56) References Cited

U.S. PATENT DOCUMENTS

| | | | |
|---|---|---|---|
| 8,541,988 B2* | 9/2013 | Horihata | H02J 7/1461 322/21 |
| 8,547,071 B2* | 10/2013 | Horihata | H02P 9/006 322/21 |
| 8,570,004 B2* | 10/2013 | Asada | H02J 7/1492 322/28 |
| 8,928,291 B2* | 1/2015 | Maruyama | H02P 9/102 322/23 |
| 9,172,240 B2* | 10/2015 | Maruyama | H02H 9/04 |
| 2003/0102845 A1* | 6/2003 | Aker | H02J 7/0042 320/139 |
| 2005/0046387 A1* | 3/2005 | Aker | H02J 7/0042 320/125 |
| 2007/0200534 A1* | 8/2007 | Kizawa | H02P 9/48 322/28 |
| 2010/0244559 A1 | 9/2010 | Goerlach et al. | |
| 2011/0285361 A1 | 11/2011 | Kihara et al. | |
| 2012/0001598 A1 | 1/2012 | Horihata et al. | |
| 2012/0007568 A1* | 1/2012 | Horihata | H02J 7/1461 322/21 |
| 2012/0074914 A1* | 3/2012 | Nakayama | H02M 7/53871 322/94 |
| 2012/0091973 A1* | 4/2012 | Horihata | H02P 9/48 322/29 |
| 2012/0098503 A1* | 4/2012 | Horihata | H02P 9/08 322/23 |
| 2014/0042990 A1* | 2/2014 | Maruyama | H02P 9/102 322/28 |
| 2014/0055894 A1* | 2/2014 | Maruyama | H02P 9/107 361/56 |
| 2014/0104908 A1 | 4/2014 | Mehringer et al. | |
| 2014/0343739 A1 | 11/2014 | Masson et al. | |
| 2015/0145459 A1* | 5/2015 | Guzelgunler | H02P 27/04 318/490 |
| 2016/0089988 A1* | 3/2016 | Bartz | B60L 11/1811 320/108 |

FOREIGN PATENT DOCUMENTS

| | | |
|---|---|---|
| JP | 2012-016158 A | 1/2012 |
| JP | 2012-175905 A | 9/2012 |
| JP | 2014-509827 A | 4/2014 |
| JP | 2014-513518 A | 5/2014 |

* cited by examiner

POWER GENERATOR WITH LOAD-DUMP PROTECTION

CROSS REFERENCE TO RELATED APPLICATION

This application is based on and claims the benefit of priority from Japanese Patent Application No. 2014-217971, filed on Oct. 27, 2014, which is incorporated in its entirety herein by reference.

TECHNICAL FIELD

The present disclosure relates to power generators for generating electrical power and/or moving power, and more particularly, to such power generators performing load-dump protection.

BACKGROUND

A typical power generator, which is an example of rotary electric machines, induces three-phase AC power in three-phase stator windings, and rectifies the three-phase AC power to generate DC power. Then, the typical power generator supplies the generated DC power to a battery via electrical lines connected between output terminals thereof and the battery. The typical power generator also supplies the generated DC power to electrical loads as their operating power.

While such a power generator is operating to supply generated power to a battery and/or electrical loads from the output terminal thereof via the electrical lines, disconnection of the electrical lines from the battery or the output terminal of the power generator causes a high voltage (a high pulse) across a corresponding phase stator winding due to the excited state of the corresponding phase stator winding. This disconnection will be referred to as load dump, and the high voltage generated due to load dump will be referred to as a load-dump surge.

Such a load-dump surge would reduce the reliability of the power generator itself and/or the electrical loads. Thus, there is a requirement to protect the power generator itself and/or the electrical loads from such a load-dump surge. Japanese Patent Application Publication No 2012-16158 discloses an example of technologies to protect a, power generator itself and/or electrical loads connected thereto from such a load-dump surge.

SUMMARY

The inventors of the present application have created a new technology to protect a power generator itself and/or electrical loads connected thereto from such a load-dump surge.

In view of the circumstances set forth above, one aspect of the present disclosure seeks to provide power generators, each of which is capable of protecting itself and electrical loads connected thereto from a load-dump surge.

According to an exemplary aspect of the present disclosure, there is provided a power generator including multi-phase armature windings, and a rectifier circuit. The rectifier circuit includes a plurality of upper-arm rectifier elements and a, plurality of lower-arm rectifier elements connected in series to the corresponding one of the upper-arm rectifier elements. The connection point between each of the upper-arm rectifier elements and the corresponding one of the lower-arm rectifier elements is connected to the corresponding one of the multiphase armature windings. The rectifier circuit is configured to output a rectified voltage as an output voltage of the rectifier circuit based on an AC phase voltage output from each of the multiphase armature windings. The upper-arm rectifier elements or the lower-arm rectifier elements are each comprised of a protective switch. The power generator includes a determiner configured to determine whether the phase voltage output from each of the multiphase armature windings has exceeded a threshold voltage. The power generator includes so a turn-on unit configured to turn on at least one of the protective switches as a target protective switch to limit the output voltage of the rectifier circuit to be lower than the threshold voltage when it is determined that the phase voltage output from at least one of the multiphase armature windings corresponding to the at least one of the protective switches has exceeded the threshold voltage.

The power generator according to the exemplary aspect of the present disclosure turns on at least one of the protective switches as a target protective switch when it is determined that the phase voltage output from at least one of the multiphase armature windings corresponding to the at least one of the protective switches has exceeded the threshold voltage.

This configuration of the power generator turns on the at least one of the protective switches as the target protective switch immediately without waiting for large drop of the phase voltage. This therefore immediately limits the output voltage of the rectifier circuit to be lower than the threshold voltage, thus protecting the electrical loads for the power generator immediately after the occurrence of load dump.

The above and/or other features, and/or advantages of various aspects of the present disclosure will be further appreciated in view of the following description in conjunction with the accompanying drawings. Various aspects of the present disclosure can include and/or exclude different features, and/or advantages where applicable. In addition, various aspects of the present disclosure can combine one or more feature of other embodiments where applicable. The descriptions of features, and/or advantages of particular embodiments should not be construed as limiting other embodiments or the claims.

BRIEF DESCRIPTION OF THE DRAWINGS

Other aspects of the present disclosure will become apparent from the following description of embodiments with reference to the accompanying drawings in which.

DETAILED DESCRIPTION OF EMBODIMENT

Figure 1:
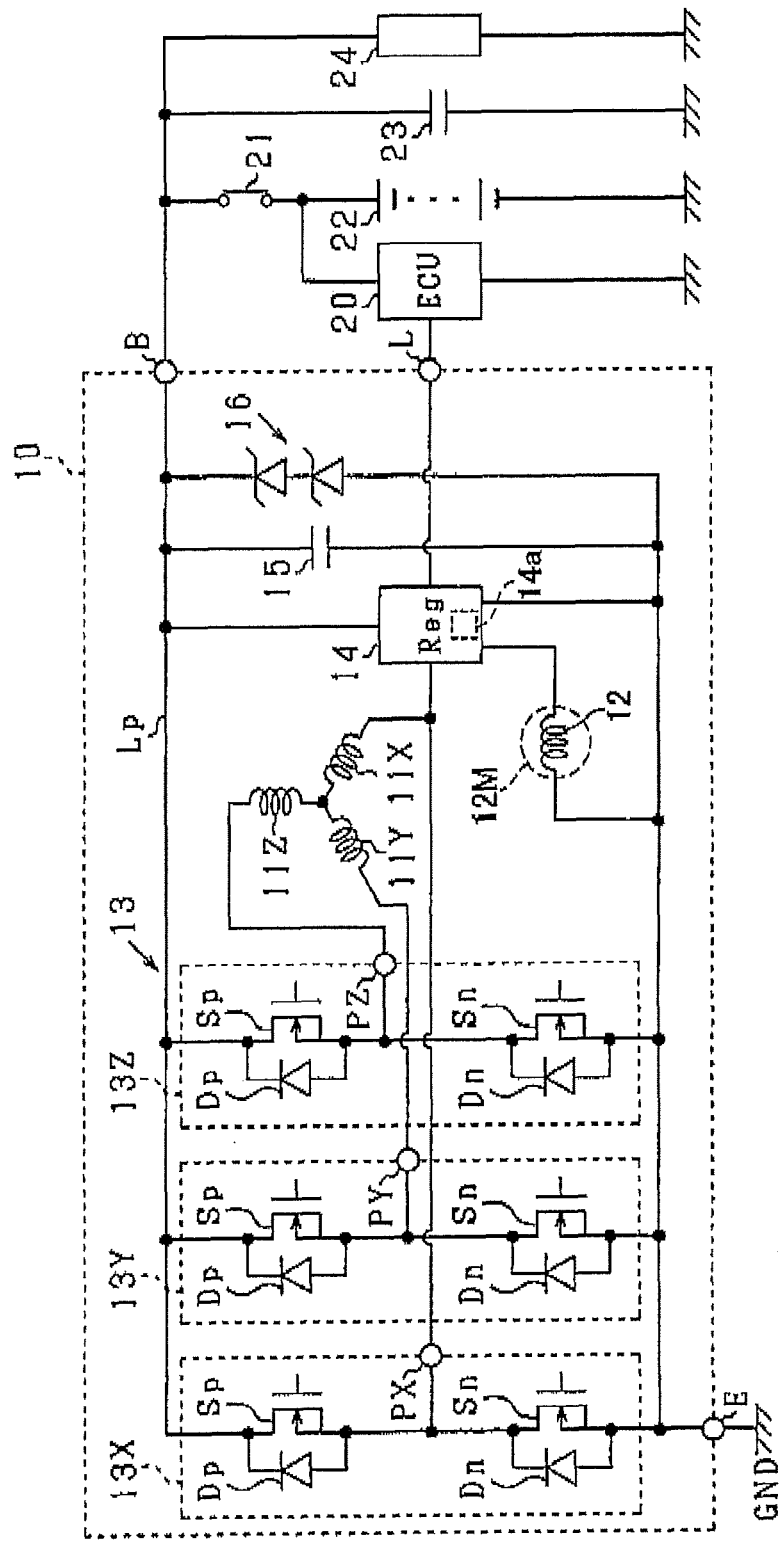
FIG. 1 is a circuit diagram schematically illustrating an example of the structure of a power generator according to the first embodiment of the present disclosure.
Figure 2:
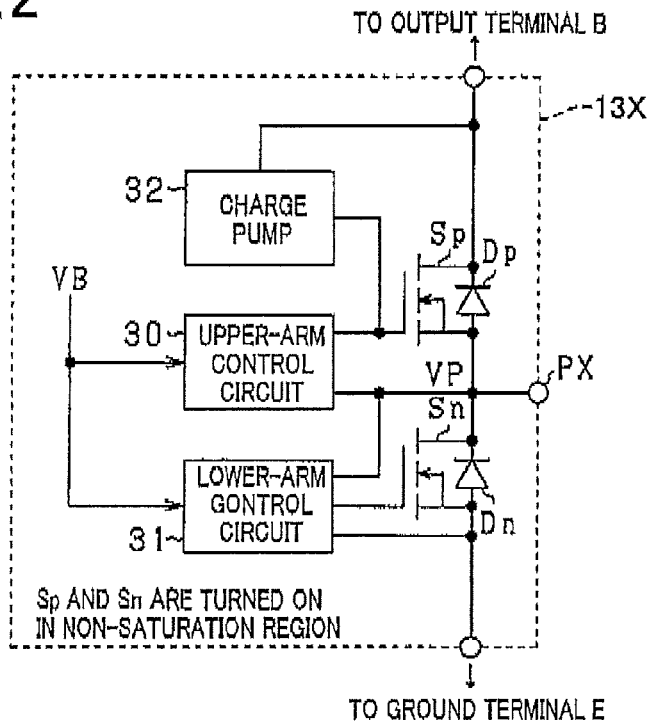
FIG. 2 is a circuit diagram schematically illustrating an example of the structure of an X-phase rectifier module illustrated in FIG. 1.

The following describes embodiments of the present disclosure with reference to the accompanying drawings. The drawings utilize identical reference characters to identify identical corresponding components.

First Embodiment

FIG. 1 schematically illustrates a power generator 10 according to the first embodiment of the present disclosure. For example, the power generator 10 according to the first embodiment is installed in a motor vehicle.

Referring to FIG. 1, the power generator 10 includes a stator 11 including three-phase, i.e. X-, Y-, and Z-phase, stator windings (armature windings) 11X, 11Y, and 11Z, a rotor 12M including at least one field winding 12, a rectifier circuit 13, and a voltage regulator, i.e. a regulator 14. The three-phase windings 11X, 11Y, and 11Z are an example of multiphase armature windings.

The power generator 10 is operative to convert, i.e. rectify, an alternating-current (AC) voltage induced in the three-phase stator windings 11X, 11Y, and 11Z into a DC voltage via the rectifier circuit 13, and supply the DC voltage to a battery 22 via a charge line Lp and an output terminal B thereof to charge it therein. The power generator 10 is also operative to supply the DC voltage to electrical loads 24 installed in the motor vehicle via the charge line Lp and the output terminal B.

The power generator 10 is further operative to convert a DC voltage supplied from the battery 22 into a three-phase AC voltage via the rectifier circuit 13, and apply the three-phase AC voltage to the three-phase stator windings 11X, 11Y, and 11Z to thereby generate rotary power (torque) to rotate the rotor 12M. For example, the rotor 12M is directly or indirectly coupled, via a belt, to a crankshaft of an internal combustion engine, referred to simply as an engine, installed in the motor vehicle so that the generated rotary power turns the crankshaft of the internal combustion engine.

The X-, Y-, and Z-phase windings 11X, 11Y, and 11Z are wound in and around an unillustrated cylindrical stator core to constitute the stator 11. The X-, Y-, and Z-phase windings 11X, 11Y, and 11Z according to the first embodiment are connected in, for example, a star configuration. Specifically, the X-, Y-, and Z-phase windings 11X, 11Y, and 1Z each have one end connected to a common junction (neutral point), and the other end to a separate terminal.

The rotor 12M is attached to, for example, a rotary shaft (not shown) and, for example, rotatably disposed within the stator core. One end of the rotary shaft is linked to directly or indirectly to the crankshaft of the internal combustion engine such that the rotor 12M and the rotary shaft are rotatably driven by the internal combustion engine, referred to as an engine. In other words, rotation of the rotor 12M can be transferred to the crankshaft of the engine as rotary power so that the crankshaft can be rotated by the rotary power.

The rotor 12M includes a plurality of field poles disposed to face the inner periphery of the stator core, and at least one field winding 12 wound in and around the field poles. The at least one field winding 12 is electrically connected to the regulator 14 via slip rings and the like. When energized by the regulator 14, the at least one field winding 12 magnetizes the field poles with alternate north and south polarities while the rotor 12M is rotating to thereby generate a rotating magnetic field. Note that, as the rotor 4M, a rotor comprising permanent magnets or a salient-pole rotor for generating a rotating magnetic field can be used. The rotating magnetic field induces a three-phase AC voltage in the stator windings 11X, 11Y, and 11Z.

The rectifier circuit 13 is disposed between the stator windings 11X, 11Y, and 11Z, and is constructed as a three-phase full-wave rectifier, i.e. a bridge circuit as a whole. The rectifier circuit 13 is operative to convert the three-phase AC voltage induced in the stator windings 11X, 11Y, and 11Z into a DC voltage.

Specifically, the rectifier circuit 13 is comprised of three rectifier modules 13X, 13Y, and 13Z corresponding to the number of phase of the stator windings 11X, 11Y, and 11Z.

Referring to FIG. 1, each of the rectifier modules 13X, 13Y, and 13Z includes a pair of upper- and lower-arm switches, which serves as rectifier elements, Sp and Sn connected in series to each other. The first embodiment uses a voltage-controlled switch as each of the switches Sp and Sn, in particular, uses an N-channel MOSFET as each of the switches Sp and Sn.

Each of the rectifier modules 13X, 13Y, and 13Z includes a pair of diodes Dp and Dn. The diode Dp is connected in antiparallel to the upper-arm switch Sp, and the diode Dn is connected in antiparallel to the lower-arm switch Sn. For example, each of the MOSFETs Sp and Sn intrinsically has an intrinsic diode (body diode) serving as a corresponding one of the diodes Dp and Dn. Note that an additional diode can be connected in antiparallel to each of the upper- and lower-arm switches Sp and Sn. A switch different in type from MOS-transistor type switch can be used as at least one of the upper- and lower-arm switches Sp and Sn. In this modification, a diode is added to be connected in antiparallel to the switch.

The source of the upper-arm switch Sp of each of the rectifier modules 13X-13Z is connected to the drain of the lower-arm switch Sn of a corresponding one of the rectifier modules 13X-13Z. The connection point between the source of the upper-arm switch Sp of each of the rectifier modules 13X-13Z and the drain of the lower-arm switch Sn of a corresponding one of the rectifier modules 13X-13Z is connected to a corresponding one of X-, Y-, and Z-phase terminals PX, PY, and PZ. Each of the X-, Y-, and Z-phase terminals PX, PY, and PZ is connected to the separate terminal of a corresponding one of the X-, Y-, and Z-phase windings 11X, 11Y, and 11Z.

The drain of the upper-arm switch Sp of each of the rectifier modules 13X-13Z is connected to the positive terminal of the battery 22 and the electric loads 24 via the charge line Lp and the output terminal B of the power generator 10. Thus, the upper-arm switches Sp also serve as high-side, switching elements.

The source of the lower-arm switch Sn of each of the rectifier modules 13X-13Z is connected to the negative terminal of the battery 22 connected to a ground GND via a common signal ground and a ground terminal E of the power generator 10. Thus, the lower-arm switches Sn also serve as low-side switches.

For example, each of the upper-arm switches Sp, i.e. the upper-arm rectifier elements, Sp is configured to permit a current to pass therethrough upon the phase voltage output from the corresponding one of the armature windings 11X to 11Z being positive, and block the passage of the current therethrough upon the phase voltage output from the corresponding one of the armature windings 11X to 11Z being negative.

In addition, the power generator 10 is provided with series-connected Zener diodes 16 connected between the output terminal B and the common signal ground in parallel to each rectifier module 13X, 13Y, 13Z.

Specifically, the cathode of the series-connected Zener diodes 16 is connected to the output terminal B of the power generator 10, and the anode thereof is connected to the common signal ground. As described later, the power generator 10 performs load-dump protection when there is a load-dump surge due to load dump, for example, disconnection of the output terminal B from the battery 22. However, the series-connected Zener diodes 16 serves to absorb an instantaneous excessively high surge due to load dump, thus protecting the rectifier modules 13X-13Z.

The power generator 10 is further provided with a first capacitor 15 connected between the output terminal B and the common signal ground in parallel to each of the rectifier modules 13X-13Z. The capacitor 15 is operative to suppress noise occurring in the output terminal B of the power generator 10.

The regulator 14 includes an IC regulator, and adjusts an excitation current, i.e. a field current, to be supplied to the at least one field winding 12, thus regulating an output voltage of the power generator 10, i.e. an output voltage VB at the output terminal B, to a target voltage. The output voltage VB at the output terminal B of the power generator 10 is a line-to-line voltage of the power generator 10.

The regulator 14 according to the first embodiment is connected to a communication terminal L of the power generator 10. That is, the regulator 14 is communicably connected to an external control unit, i.e. an external electronic control unit (ECU) 20. For example, the regulator 14 is operative to carry out aerial bidirectional communications, such as LIN (Local Interconnect Network) communications in accordance with LIN protocols, with the ECU 20, thus sending and/or receiving communication messages to and/or from the ECU 20.

The regulator 14 serves as, for example, a current controller for controlling the level of the field current to be supplied to the field winding 12.

For example, the regulator 14 recognizes the target voltage according to the serial communications with the ECU 20, and compares the output voltage VB at the output terminal B with the target voltage.

When the output voltage at the output terminal B is higher than the target voltage based on the results of the comparison, the regulator 14 stops the supply of the field current to the at least one field winding 12 or reduce the level of the excitation current thereto. In contrast, when the output voltage VB is lower than the target voltage, the regulator 14 supplies the field current to the at least one field winding 12 or increases the level of the field current to be supplied to the field winding 12. The above task, i.e. the usual field-current control task, regulates the output voltage VS to the target voltage, thus controlling the power generated by the power generator 10.

For example, the regulator 14 includes a switch 14a between the output voltage VB and the at least one field winding 12, and generates a PWM signal that is a cyclic pulse signal having a controllable duty cycle, i.e. a controllable on-pulse width for each cycle; the duty cycle is expressed as a predetermined ratio, i.e. percentage, of high-level width to the total duration of each cycle. The width, i.e. the on period, of each pulse of the cyclic pulse signal is determined depending on the results of the comparison.

For example, the regulator 14 generates the PWM signal having a high duty cycle, and controls on-off operations of the switch 14a based on the duty cycle of the PWM signal if the output voltage VB is lower than the target voltage. This increases the level of the field current to be supplied to the at least one field winding 12. The regulator 14 generates the PWM signal having a low duty cycle, and controls on-off operations of the switch 14a based on the duty cycle if the output voltage VB is higher than the target voltage. This decreases the level of the field current to be supplied to the at least one field winding 12.

The output terminal B of the power generator 10 is connected to the ECU 20 and the positive terminal of the battery 22 via a relay 21. The ECU 20 is connected to the ground GND, and the negative terminal of the battery 22 is connected to the ground GND. A second capacitor 23 and the electrical loads 24 are connected between the output terminal B and the ground GND. The relay 21 is configured to be on while an unillustrated ignition switch of the motor vehicle is on.

Next, the following describes an example of the structure of each of the X-, Y-, and Z-phase rectifier modules 13X-13Z. In particular, the following describes an example of the structure of the X-phase rectifier module 13X as a representative for the X-, Y-, and Z-phase rectifier modules 13X-13Z because the X-, Y-, and Z-phase rectifier modules 13X-13Z have a common structure.

The X-phase rectifier module 13X includes an upper-arm control circuit 30, a lower-arm control circuit 31, and a charge pump 32 in addition to the upper- and lower-am switches Sp and Sn. The charge pump 32 is connected to the output terminal B, and operative to boost the output voltage at the output terminal B, thus supplying the boosted voltage to the upper-arm control circuit 30. The upper-arm control circuit 30 is connected to the gate, i.e. on-off control terminal, of the upper-arm switch Sp and the X-phase terminal PX, and performs on-off operations of the upper-arm switch Sp based on the boosted voltage supplied from the charge pump 32.

The lower-arm control circuit 31 performs on-off operations of the lower-arm switch Sn. The following describes an example of the structure of the lower-arm control circuit 31.

The lower-arm control circuit 31 has first, second, and third terminals T1, T2, and T3, and the lower-arm control circuit 31 includes a diode 31*a*, a power-source capacitor 31*b*, a Zener diode 31*c*, and a control unit 33. The anode of the diode 31*a* is connected to the first terminal T1, and the cathode of the diode 31*a* is connected to the ground terminal E of the power generator 10 via the power-source capacitor 31*b* and the second terminal T2. The cathode of the Zener diode 31*c* is connected to the first terminal T1, and the anode of the Zener diode 31*c* is connected to the gate, i.e. an on-off control terminal, of the lower-arm switch Sn via the third terminal T3.

The control unit 33 is connected to the connection point between the cathode of the diode 31*a* and the power-source capacitor 31*b*, to the first terminal T1, and to the connection point between the anode of the Zener diode 31*c* and the third terminal T3.

The control unit 33 includes a detector 33*a* that measures the output voltage, i.e. the phase voltage VP, of the X-phase winding 11X via the X-phase terminal PX and the first terminal T1. The detector 33*a* also measures the voltage at the output terminal 8 as the output voltage, referred to as the output voltage VB, of the power generator 10.

The control unit 33 also includes a controller 33*b* operative to perform, according to the measured phase voltage VP and output voltage VB, on-off operations of the lower-arm switch Sn using the power-source capacitor 31*b* as its power source.

The structure of the lower-arm control circuit 31 enables the power-source capacitor 31*b* to be charged in the following procedure. While the potential at the X-phase terminal PX, i.e. the first terminal T1, is higher than the potential at the ground terminal E, i.e. the second terminal T2, an output current from the X-phase winding 11X is flowing into the power-source capacitor 31*b* via the X-phase terminal PX, the first terminal X1, and the diode 31*a*. Specifically, the power-source capacitor 31*b* is charged within the period while the output voltage of the X-phase winding 11X has a positive polarity. Note that no charge is performed for the power-source capacitor 31*b* while the output voltage of the X-phase winding 11X has a negative polarity.

The upper-arm control circuit 30 of the first embodiment drives, i.e. turns on, the upper-arm switch Sp in its non-saturated region, and similarly the lower-arm control circuit 31 of the first embodiment drives, i.e. turns on, the lower-arm switch Sn in its non-saturated region. The non-saturated region of a MOSFET represents a specific region in the output characteristics of the MOSFET, which represents the correlations between the drain-source voltage Vds and the drain current Id of the MOSFET. In the specific region, the drain current Id increases with an increase of the drain-source voltage Vds. This causes the on-resistance of each of the switches Sp and Sn to be zero while the corresponding switch is on.

Each of the upper- and lower-arm control circuits 30 and 31 is configured to measure the output voltage, i.e. the phase voltage VP, of the X-phase winding 11X via the X-phase terminal PX and the first terminal T1. Each of the upper- and lower-arm control circuits 30 and 31 is also configured to measure the voltage at the output terminal B as the output voltage, referred to as the output voltage VB, of the power generator 10. Note that the anode of the diode 31*a* can be connected to the output terminal B in place of the X-phase terminal PX via the first terminal T1.

Figure 4:
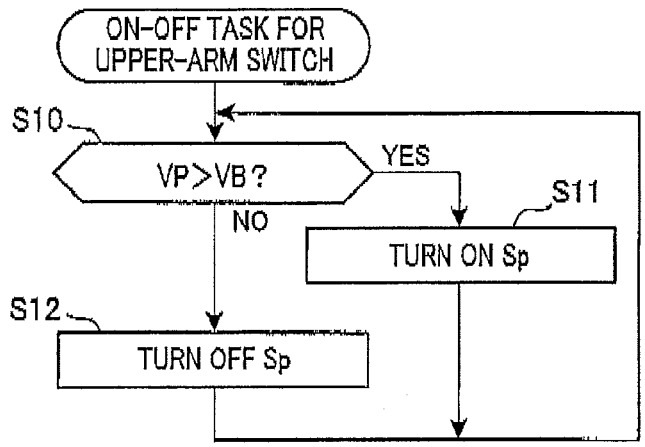
FIG. 4 is a flowchart schematically illustrating the routine of an on-off task of an upper-arm switch carried out by an upper-arm control circuit illustrated in FIG. 2.
Figure 5:
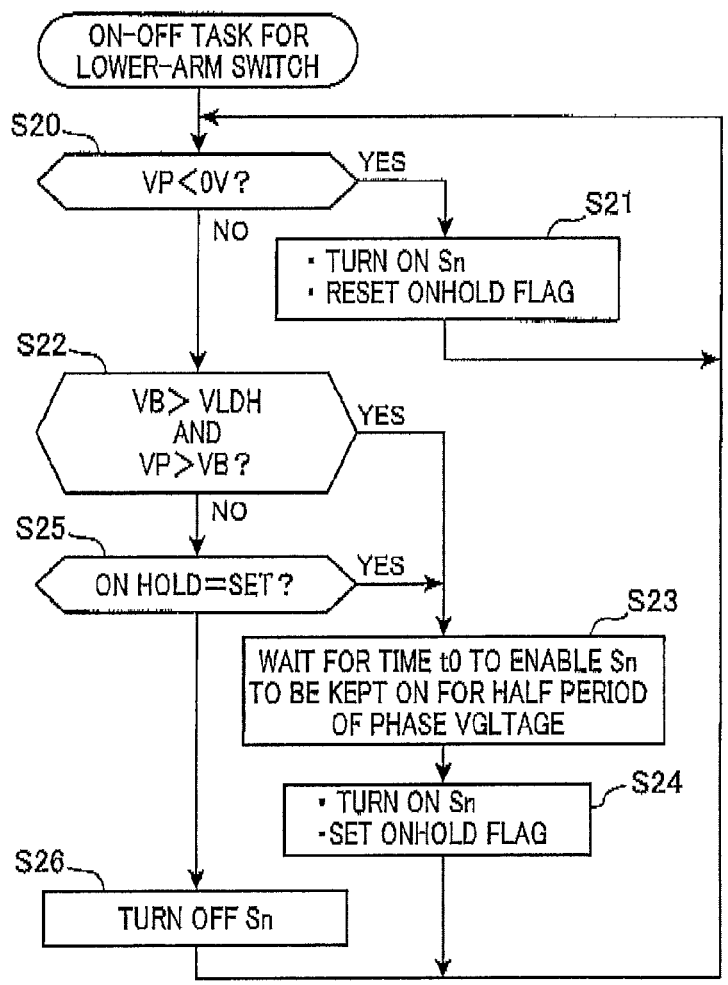
FIG. 5 is a flowchart schematically illustrating the routine of an on-off task of a lower-arm switch carried out by the lower-arm control circuit.

Next, the following describes an on-off task of each of the switches Sp and Sn according to the first embodiment with reference to FIGS. 4 and 5.

First, the following describes the on-off task of the upper-arm switch Sp carried out by the upper-arm control circuit 30 using FIG. 4. The upper-arm control circuit 30 cyclically performs the on-off task of the upper-arm switch Sp for each of the X-, Y-, and Z-phases.

When starting the on-off task, the upper-arm control circuit 30 determines whether the measured phase voltage VP is higher than the measured output voltage VB in step S10.

Upon determining that the measured phase voltage VP is higher than the measured output voltage VB (YES in step S10), the upper-arm control circuit 30 turns on the upper-arm switch Sp or maintains the upper-arm switch Sp in the on state in step S11. Otherwise, upon determining that the measured phase voltage VP is equal to or lower than the measured output voltage VB (NO in step S10), the upper-arm control circuit 30 turns off the upper-arm switch Sp or keeps the upper-arm switch Sp off in step S12. The upper-arm control circuit 30 returns to step S10 after the completion of the operation in step S11 or S12, and performs the operation in step S10 again.

The lower-arm control circuit 31 performs an on-off task of the lower-arm switch Sn for each of the X-, Y-, and Z-phases in accordance with the on-off task of the upper-arm switch Sp for each of the X-, Y-, and Z-phases performed by the upper-arm control circuit 30. The on-off task of each of the upper-arm switches Sp and the ork-off task of each of the lower-arm switches Sn convert the three-phase AC voltages, i.e. the three-phase alternating currents, output from the three-phase stator windings 11X, 11Y, and 11Z into a DC voltage, i.e. a direct current, thus supplying the DC voltage, i.e. direct current, to the battery 22 and the electrical loads 24 via the output terminal B. At that time, if the electrical line connecting between the output terminal B and both the battery 22 and the electrical loads 24 is disconnected from the output terminal B or the positive terminal of the battery 22, a high voltage (a high pulse), which is referred to as a load-dump surge, may occur across a corresponding phase stator winding due to the excited state of the corresponding phase stator winding. The load-dump surge may reduce the reliability of the power generator 10 itself, the battery 22, and the electrical loads 24.

In view of this circumstance, the lower-arm control circuit 31 of each of the X-, Y-, and Z-phase rectifier modules 13X, 13Y, and 13Z performs the on-off task of the lower-arm switch Sn for a corresponding one of the X-, Y-, and Z-phases; the on-off task includes a load-dump protection task for protecting the power generator 10, the battery 22, and the electrical loads 24 against such a load-dump surge.

Next, the following describes the routine of the on-off task of the lower-arm switch. Sn carried out by the lower-arm control circuit 31, i.e. the controller 33*b*, of each of the X-, Y-, and Z-phase rectifier modules 13X, 13Y, and 13Z using FIG. 5. The lower-arm control circuit 31 each of the X-, Y-, and Z-phase rectifier modules 13X, 13Y, and 13Z cyclically performs the routine of the on-off task of the lower-arm switch Sn.

When starting the on-off task, the lower-arm control circuit 31 serves as, for example, a second determiner that determines whether the measured phase voltage VP is lower than 0 V serving as, for example, a second threshold voltage, in step S20.

Upon determining that the measured phase voltage VP is lower than 0 V (YES in step S20), the lower-arm control circuit 31 serves as, for example, a second turn-on unit that turns on the lower-arm switch Sn or maintains the lower-arm switch Sn in the on state, and resets an on-hold flag ONhold therein described later in step S21. That is, the lower-arm, control circuit 31 resets a high level of the on-hold flag ONhold flag to a low level. After the operation in step S21, the lower-arm control circuit 31 returns to step S20 and performs the operation in step S20 again.

Otherwise, upon determining that the measured phase voltage VP is equal to or higher than 0 V (NO in step S20), the lower-arm control circuit 31 performs the operation in step S22.

In step S22, the lower-arm control circuit 31 serves as, for example, a determiner that determines whether the following first and second load-dump protection conditions are satisfied, in other words, the logical AND of the first and second conditions are true in step S22:

(1) The first load-dump protection condition is that the output voltage VB is higher than, i.e. has exceeded, an allowable upper limit voltage VLDH, such as 20 V, higher than 0 V (2) The second load-dump protection condition is that the phase voltage VP is higher than, i.e. has exceeded, the output voltage VB.

Specifically, the first load-dump protection condition represents a condition to determine whether a load-dump has occurred. The second load-dump protection condition in step S22 carried out by the lower-arm control circuit 31 of each of the X-, Y-, and Z-phase rectifier modules 13X, 13Y, and 13Z represents a condition to identify whether the corresponding armature winding is a target armature winding across which a load-dump surge is generated.

Upon determining that the first and second load-dump protection conditions are satisfied, in other words, the logical AND of the first and second load-dump protection conditions are true (YES in step S22), the lower-arm control circuit 31 of a corresponding one of the X-, Y-, and Z-phase rectifier modules 13X, 13Y, and 13Z carries out the following load-dump protection task including the operations in steps S23 and S24. That is, the lower-arm control circuit 31 identifies whether the corresponding lower-arm switch Sn is a target lower-arm switch for performing load-dump protection.

Specifically, in step S23, the lower-arm control circuit 31 serves as, for example, a turn-on unit that waits for a predetermined time t0 after the affirmative determination in step S22.

Then, the lower-arm control circuit 31 turns on the lower-arm switch Sn after the predetermined time t0 has elapsed since the affirmative determination in step S22, thus clamping the output terminal of the corresponding armature winding to the potential at the ground GND in step S24.

In step S24, the lower-arm control circuit 31 also sets the ONhold flag therein, that is, changes the ONhold flag from the low level to the high level. Turning on the lower-arm switch Sn while the corresponding upper-arm switch Sp is on causes the output terminal of the corresponding armature winding to be clamped to the potential of the ground GND, thus reducing the phase voltage VP to be equal to or lower than the output voltage VB. This results in the upper-arm switch Sp being immediately off.

The predetermined time t0 according to the first embodiment is established such that the predetermined time t0 enables a predetermined amount of electrical charge to be stored in the power-source capacitor 31b. The predetermined amount of electrical charge stored in the power-source capacitor 31b enables the lower-arm switch Sn to be continuously kept on over at least half period, i.e. half electrical angular period, of the AC voltage output from the corresponding armature winding.

The reason why the time to continuously keep on the lower-arm switch Sn is set to the half period, i.e. π, of the corresponding AC phase voltage output from an armature winding is that (1) A load-dump surge occurring across an armature winding is due to the AC phase voltage across the armature winding having a positive polarity (2) The period during which the AC phase voltage across an armature winding has a positive polarity is the half period of the AC phase voltage.

If the lower-arm switch Sn was switched off due to the shortage of power supply from the power-source capacitor 31b to the lower-arm control circuit 31 during the output voltage of an armature winding across which a load-dump surge has occurred, it could be difficult to suppress the load-dump surge. To address such a disadvantage, the first embodiment establishes the predetermined time, i.e. the waiting time, t0, and disables the lower-arm control circuit 31 from turning on the lower-arm switch Sn until the waiting time t0 has elapsed since the affirmative determination in step S22. Then, the first embodiment enables the lower-arm control circuit 31 to turn on the lower-arm switch Sn after the predetermined time t0 has elapsed since the affirmative determination in step S22.

The lower-control circuit 31, which has completed the operation in step S24, returns to step S20 and performs the operation in step S20 again.

Otherwise, if it is determined that at least one of the first and second load-dump protection conditions are unsatisfied, in other words, the logical AND of the first and second load-dump protection conditions are false (NO in step S22), the routine of the on-off task proceeds to step S25.

In step S25, the lower-arm control circuit 31 determines whether the on-hold flag ONhold is set, i.e. the on-hold flag ONhold has the high level. If it is determined that the on-hold flag ONhold is set, i.e. the on-hold flag ONhold has the high level (YES in step S25), the routine of the on-off task proceeds to step S23, and the lower-arm control circuit 31 performs the subsequent operations from step S23. Otherwise, if it is determined that the on-hold flag ONhold is reset, i.e. the on-hold flag ONhold has the low level (NO in step S25), the routine of the on-off task proceeds to step S26.

In step S26, the lower-arm control circuit 31 turns off the lower-arm switch Sn. The lower-control circuit 31, which has completed the operation in step S26, returns to step S20 and performs the operation in step S20 again. The operation in step S26 with the on-hold flag ONhold being reset serves as, for example, a turn-off unit.

The described on-off tasks illustrated in FIGS. 4 and 5 keep the upper-arm switch Sp on and keep the lower-arm switch Sn off over a period where the corresponding phase voltage Vp is higher than the output voltage VB without the occurrence of load dump. Additionally, the described on-off tasks illustrated in FIGS. 4 and 5 maintain the upper-arm switch Sp in the off state and maintain the lower-arm switch Sn in the on state over a period where the corresponding phase voltage Vp is negative without the occurrence of load dump. This results in usual synchronous rectification being carried out.

In contrast, if a load-dump surge is generated across an armature winding, which is referred to as a target armature winding, due to the occurrence of load dump, the lower-arm control circuit 31 for the target armature winding determines that the output voltage VB has exceeded the allowable upper limit voltage VLDH that serves as, for example, a threshold voltage, once, and the phase voltage VP has exceeded the output voltage VB once (YES in step S22). Then, after lapse of the waiting time t0 since the affirmative determination in step S22, the lower-arm control circuit 31 for the target armature winding continuously keeps off the corresponding lower-arm switch Sn until the phase voltage VP, which exceeded the output voltage VB, becomes negative, in other words, the on-hold flag ONhold is reset (see steps S21 and S25).

This configuration of the lower-arm control circuit 31 of each of the X-, Y-, and Z-phase rectifier modules 13X, 13Y, and 13Z causes the corresponding armature winding to be short-circuited to the ground GND if a load-dump surge has occurred across the corresponding armature winding, thus preventing an output current from the corresponding armature winding from flowing to the output terminal B. This enables the in-vehicle electrical loads connected to the output terminal B to be protected from the load-dump surge.

The lower-arm control circuit 31 can be designed as a microcomputer unit (programmed logic unit) comprised of at least a CPU and a memory. In this example, the CPU runs at least one program stored in the memory to perform the operations illustrated in FIG. 5. As another example, the lower-arm control circuit 30 can be designed as a hardware circuit. In this example, the hardware circuit performs the operations illustrated in FIG. 5 using analog signals or analog information. In a further example, the lower-arm control circuit 30 can be designed as a hardware/software hybrid circuit. The hardware/software hybrid circuit can perform some of the operations illustrated in FIG. 5 using at least one program, and the remaining operations using analog signals or analog information.

Figure 6:
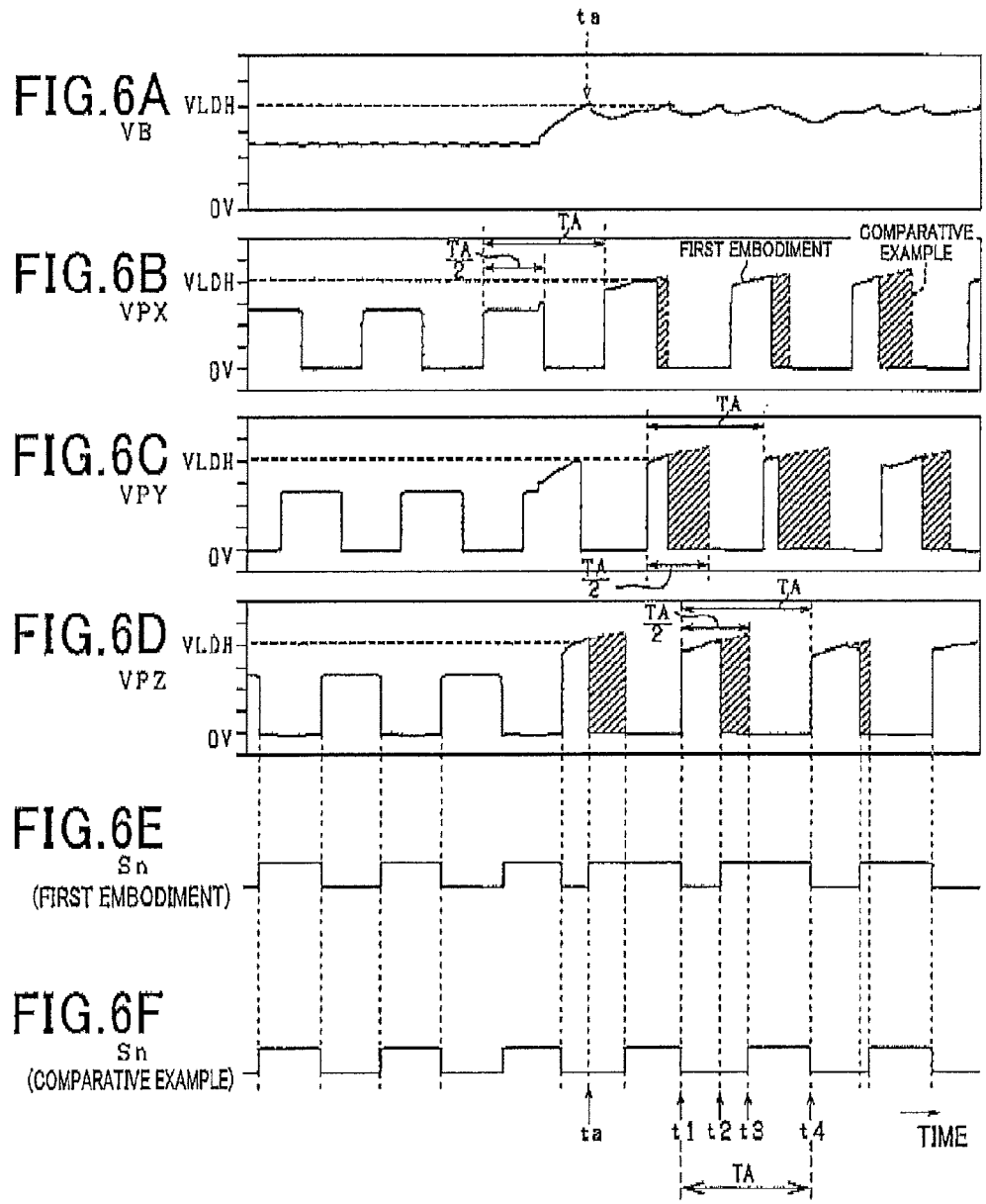
FIGS. 6A to 6F are a joint timing chart schematically illustrating change of predetermined electrical parameters of the power generator over time on the basis of a load-dump protection task included in the routine of the on-off task of the lower-arm switch illustrated in FIG. 5.

FIGS. 6A to 6F illustrate change of predetermined electrical parameters of the power generator 10 over time on the basis of the load-dump protection task including the operations in steps S23 and S24 illustrated in FIG. 5. Specifically, FIG. 6A illustrates how the output voltage VB of the power generator 10 as the first parameter changes over time, and FIG. 6B illustrates how the X-phase voltage, referred to as VPX, changes over time. FIG. 6C illustrates how the Y-phase voltage, referred to as VPY, changes over time, and FIG. 61) illustrates how the Z-phase voltage, referred to as VPZ, changes over time. FIG. 6E represents how the lower-arm switch Sn for the Z-phase is operated in the power generator 10 according to the first embodiment. FIG. 6F represents how the lower-arm switch Sn for the Z-phase is operated in a power generator according to a comparative example. Note that the power generator according to the comparative example is configured such that the lower-arm control circuit 31 performs the operations in steps S20, S21, and S26 without performing the operations in steps S22 to S25. Reference character TA in FIG. 6 represents one period of the AC voltage output from each of the armature windings 11X, 11Y, and 11Z. Note that each of FIGS. 6B to 6D represents that the minimum value of the corresponding phase voltage VPX, VPY, or VPZ is a negative value during the usual synchronous rectification.

Referring to FIGS. 6A to 6F, load dump occurs at time ta so that the output voltage VB is exceeding the allowable upper limit voltage VLDH and the Z-phase voltage VPZ is exceeding the output voltage VB. This causes the first and second load-dump protection conditions to be satisfied so that the determination in step S22 is affirmative, thus turning on the lower-arm switch Sn for the Z-phase after the predetermined time t0 has elapsed since the affirmative determination in step S22.

Thereafter, each of the lower-arm switches Sn for the X-, Y-, and Z-phases is successively turned on each time a corresponding phase voltages VPX, XPY, and VPZ becomes higher than the output voltage VB (see, for example, time t2).

Let us focus on one period TA of the AC voltage, i.e. the Z-phase voltage VPZ from time t1 to time t4 in FIGS. 6D to 6F.

FIGS. 6D and 6F illustrate that (1) The load-dump protection task causes the lower-arm switch Sn for the Z-phase, which is turned off at the time t1, to be turned on to short-circuit the Z-phase winding 11Z to the ground GND when the Z-phase voltage VPZ becomes higher than the output voltage VB at time t2

(2) The load-dump protection task maintains the on state of the lower-arm switch Sn for the Z-phase is maintained up to time t3

(3) The synchronous rectification based on the operation in step S21 further maintains the on state of the lower-arm switch Sn for the Z-phase up to time t4 because the Z-phase voltage VZ is negative for the period from the time t3 to the time t4.

That is, the lower-arm control circuit 31 according to the first embodiment maintains the lower-arm switch Sn in the off state for the Z-phase winding for the period from the time t2 to the time t4.

In contrast, FIGS. 6D and 6E illustrate that (1) The comparative example causes the lower-arm switch Sn for the Z-phase, which is turned off at the time t1, to be turned on to short-circuit the Z-phase winding 11Z to the ground GND when the Z-phase voltage VPZ becomes negative at the time t3

(2) The comparative example maintains the on state of the lower-arm switch Sn for the Z-phase up to the time t4.

That is, the comparative example maintains the lower-arm switch Sn in the off state for the Z-phase winding 11Z for the period from the time t3 to the time t4.

This results in the lower-arm control circuit 31 according to the first embodiment (1) Making the start of the load-dump protection earlier, i.e. the short-circuit of the Z-phase winding 11Z to the ground GND, as compared with the comparative example (2) Making the period of the load-dump protection longer, i.e. the short-circuit of the Z-phase winding 11Z to the ground GND, as compared with the comparative example.

This is established similarly for the X-phase and the Y-phase (see FIGS. 6B and 6C). Specifically, each of FIGS. 6B to 6D illustrates that the on state of the lower-arm switch Sn of a corresponding one of the X-, Y-, and Z-phases for the comparative example is longer than the on state of the lower-arm switch Sn of a corresponding one of the X-, Y-, and Z-phases for the first embodiment by the time length of the corresponding hatched region.

For example, the on state of the lower-arm switch Sn of the Z-phase for the comparative example is longer than the on state of the lower-arm switch Sn of the Z-phase for the first embodiment by the time length of the corresponding hatched region from the time t2 to the time t3.

As described in detail above, the power generator 10 according to the first embodiment is configured to determine whether the first and second load-dump protection conditions are satisfied:

(1) The first load-dump protection condition is that the output voltage VB is higher than the allowable upper limit voltage VLDH (2) The second load-dump protection condition is that the phase voltage VP for one of the X-, Y-, and Z-phases is higher than the output voltage VB.

Upon determining that the first and second load-dump protection conditions are established, i.e. the output voltage VB is higher than the allowable upper limit voltage VLDH, and the phase voltage VP for one of the X-, Y-, and Z-phases, which is referred to as a specified phase, is higher than the output voltage VB, the power generator 10 is configured to perform the load-dump protection task that turns on the lower-arm switch Sn connected to the specified-phase armature winding.

This makes the protection of the in-vehicle electrical loads connected to the output terminal B of the power generator 10 earlier and longer, thus more reliably protecting the in-vehicle electrical loads against a load-dump surge.

In particular, upon determining that the first and second first and second load-dump protection conditions are satisfied, the power generator 10 is configured to turn on the lower-arm switch Sn connected to the specified-phase armature winding at the timing when the predetermined waiting time t0 has elapsed since the establishment of both the first and second load-dump protection conditions. The waiting time t0 is established such that the predetermined time t0 enables the predetermined amount of electrical charge to be stored in the power-source capacitor 31$b$. The predetermined amount of electrical charge stored in the power-source capacitor 31$b$ enables the lower-arm switch Sn to be continuously kept on over the half period, i.e. TA/2, of the AC voltage output from the corresponding armature winding.

This configuration enables the lower-arm control circuit 31 for the specified-phase to reliably perform the load-dump protection task to turn on the lower-arm switch Sn connected to the specified-phase armature winding. This prevents the lower-arm switch Sn for the specified-phase from being switched off during the period that the load-dump protection task should maintain the lower-arm switch Sn off. This results in more improvement of the reliability of the in-vehicle electrical loads connected to the output terminal B against a load-dump surge.

Additionally, the power generator 10 is configured to turn on each of the upper- and lower-arm switches Sp and Sn for each of the X-, Y-, and Z-phases in its non-saturated region. This reduces the on-resistance of each of the upper- and lower-arm switches Sp and Sn for each of the X-, Y-, and Z-phases, thus reducing loss in each of the rectifier modules 13X, 13Y, and 13Z during the usual synchronous rectification or the load-dump protection task.

In step S22, the lower-arm control circuit 31 determines whether the following first and second load-dump protection conditions are satisfied, in other words, the logical AND of the first and second conditions are true:

(1) The first load-dump protection condition is that the output voltage VB is higher than the allowable upper limit voltage VLDH (2) The second load-dump protection condition is that the phase voltage VP is higher than the output voltage VB.

The present disclosure is not limited to the configuration.

Specifically, the lower-arm control circuit 31 can determine whether the phase voltage VP is higher than, i.e. has exceeded, the allowable upper limit voltage VLDH serving as, for example, the threshold voltage in step S22.

Upon determining that the phase voltage VP is higher than the allowable upper limit voltage VLDH (YES in step S22), the lower-arm control circuit 31 of a corresponding one of the X-, Y-, and Z-phase rectifier modules 13X, 13Y, and 13Z carries out the following load-dump protection task including the operations in steps S23 and S24. Otherwise, upon determining that the phase voltage VP is equal to or lower than the allowable upper limit voltage VLDH (NO in step S22), the lower-arm control circuit 31 of a corresponding one of the X-, Y-, and Z-phase rectifier modules 13X, 13Y, and 13Z carries out the operation in step S25.

In other words, the condition that the phase voltage VP is higher than the allowable upper limit voltage VLDH satisfies both the first and second conditions. This is because the output voltage VB of the rectifier circuit 13 is equal to the subtraction of the voltage drop of the on-state lower-arm switch from the phase voltage VP relative to the potential at the ground GND. In other words, the sum of the output voltage VB and the voltage drop of the on-state lower-arm switch is equal to the phase voltage VP relative to the potential at the ground GND.

Second Embodiment

Figure 7:
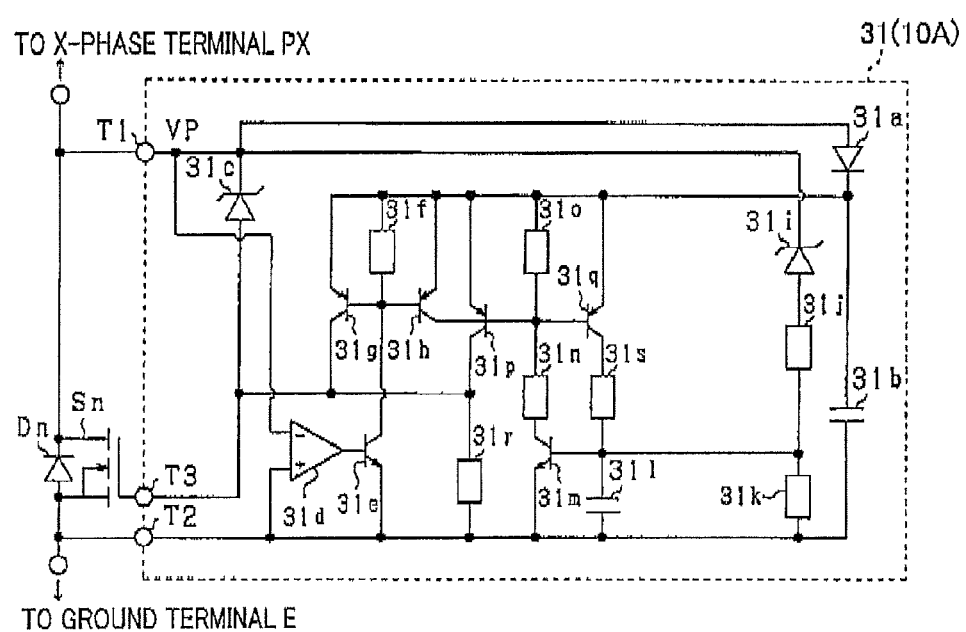
FIG. 7 is a circuit diagram schematically illustrating an example of the structure of a lower-arm control circuit according to the second embodiment of the present disclosure.

Next, the following describes a power generator 10A according to the second embodiment of the present disclosure with reference to FIG. 7. The structure and/or functions of the power generator 10A according to the second embodiment differ from the power generator 10 according to the first embodiment in the following points. So, the following mainly describes the different points.

Figure 3:
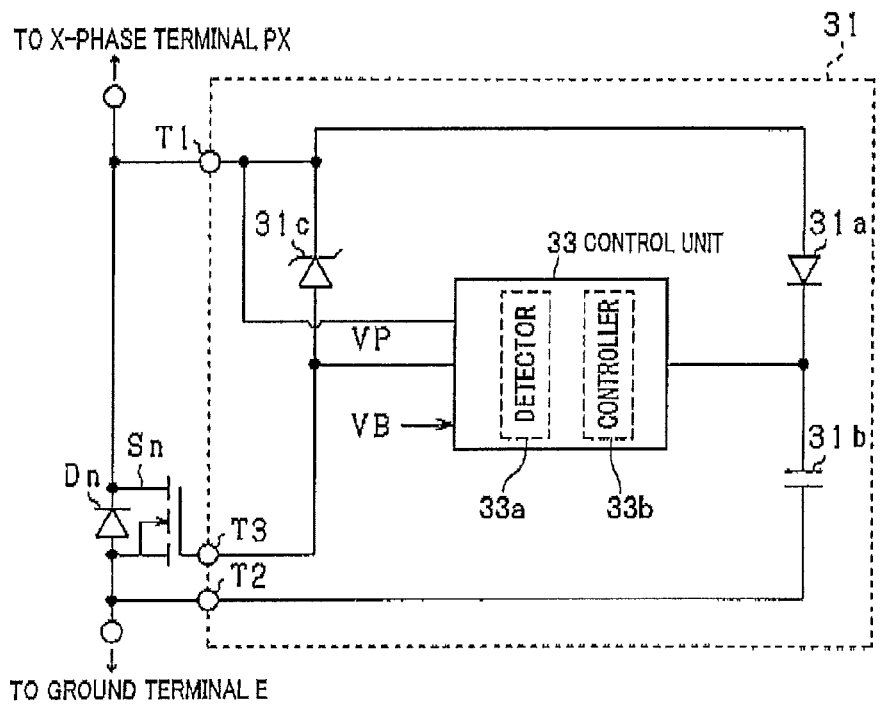
FIG. 3 is a circuit diagram schematically illustrating an example of the structure of a lower-arm control circuit illustrated in FIG. 2.

The power generator 10A includes a lower-arm control circuit 31A having a structure partially differing from the structure of the lower-arm control circuit 31. Specifically, the lower-arm control circuit 31A for each of the X-, Y-, and Z-phases performs the load-dump protection task based on the corresponding phase voltage VP with no structure measuring the output voltage VB. The elements illustrated in FIG. 7, which are substantially identical to the elements illustrated in FIG. 3, have the same reference numerals assigned thereto as the reference numerals of the elements illustrated in FIG. 3.

Next, the following describes an example of the structure of the lower-arm control circuit 13A of each of the X-, Y-, and Z-phase rectifier modules 13X-13Z. In particular, the following describes an example of the structure of the lower-arm control circuit 13A of the X-phase rectifier module 13X as a representative for the X-, Y-, and Z-phase rectifier modules 13X-13Z because the X-, Y-, and Z-phase rectifier modules 13X-13Z have a common structure.

The lower-arm control circuit 31A includes a comparator 31$d$, a first transistor, such as a first NPN transistor, 31$e$, a first resistor 31$f$, a second transistor, such as a second PNP transistor, 31$g$, a third transistor, such as a third PNP transistor, 31$h$, and a second Zener diode 31$i$. The lower-arm control circuit 31A also includes a second resistor 31$j$, a third resistor 31$k$, an adjustment capacitor 31$l$, a fourth transistor, such as a fourth NPN transistor 31$m$, a fourth resistor 31$n$, and a fifth resistor 31$o$. The lower-arm control circuit 31A further includes a fifth transistor, such as a fifth PNP transistor, 31$p$, a sixth transistor, such as a sixth PNP transistor, 31$q$, a sixth resistor 31$r$, and a seventh resistor 31$s$.

The comparator 31$d$ has a non-inverting input terminal, an inverting input terminal, and an output terminal. The inverting input terminal of the comparator 31$d$ is connected to the first terminal T1, and the non-inverting input terminal is connected to the second terminal T2. The output terminal of the comparator 31$d$ is connected to the base of the first transistor 31$e$, and the emitter of the first transistor 31$e$ is connected to the second terminal T2.

The first resistor 31$f$ has first and second ends opposite to each other. The collector of the first transistor 31$e$ is connected to the first end of the first resistor 31$f$ and the base of each of the second and third transistors 31$g$ and 31$h$. The second end of the first resistor 31f is connected to the emitter of each of the second and third transistors 31g and 31h. The collector of the second transistor 31g is connected to the third terminal T3. The second end of the first resistor 31f is connected to the connection point between the cathode of the diode 31a and the power-source capacitor 31b. The cathode of the second Zener diode 31i is connected to the first terminal T1, and the anode of the second Zener diode 31i is connected to the second terminal T2 via the series-connected second and third resistors 31j and 31k. The adjustment capacitor 31l has first and second electrodes opposite to each other. The connection point between the second and third resistors 31j and 31k is connected to the first electrode of the adjustment capacitor 31l, and to the base of the fourth transistor 31m. The second terminal T2 is connected to the second electrode of the adjustment capacitor 31l and the emitter of the fourth transistor 31m.

The second Zener diode 31i according to the second embodiment has a predetermined breakdown voltage, i.e. a predetermined Zener voltage, previously set to the allowable upper limit voltage VLDH. The adjustment capacitor 31l has a previously determined capacitance that determined the waiting time t0.

The collector of the fourth transistor 31m is connected, via the series-connected fourth and fifth resistors 31n and 31o, to the connection point between the cathode of the diode 31a and the power-source capacitor 31b. Each of the fourth and fifth resistors 31n and 31o has first and second ends opposite to each other. The fourth and fifth resistors 31n and 31o are connected in series to each other via their first ends. The connection point between the series-connected fourth and fifth resistors 31n and 31o is connected to the base of each of the fifth and sixth transistors 31p and 31q and to the collector of the third transistor 31h.

The emitter of the fifth transistor 31p is connected to the second end of the fifth resistor 31o. The sixth resistor 31r has first and second ends opposite to each other. The collector of the fifth transistor 31p is connected to the third terminal T3 and the first end of the sixth resistor 31r. The second end of the sixth resistor 31r is connected to the second terminal T2. The emitter of the sixth transistor 31q is connected to the connection point between the cathode of the diode 31a and the power-source capacitor 31b. The collector of the sixth transistor 31q is connected to the first end of the adjustment capacitor 31l via the seventh resistor 31s.

Next, the following describes the usual synchronous rectification carried out by the lower-arm control circuit 31A.

When the potential at the X-phase terminal PX, i.e. the first terminal T1, is higher than the potential at the ground terminal E, i.e. the second terminal T2, an output current from the X-phase winding 11X flows into the power-source capacitor 31b. This charges the power-source capacitor 31b. When the potential at the X-phase terminal PX is higher than the potential at the ground terminal E, an output signal having a logical low level L is output from the output terminal of the comparator 31d. The output signal having the logical low level L turns off the first transistor 31e, thus turning off the second transistor 31g. This results in no supply of power from the power-source capacitor 31b to the gate of the lower-arm switch Sn via the second transistor 31g and the third terminal T3. This turns off the lower-arm switch Sn or maintains the lower-arm switch Sn in the off state.

When the potential at the X-phase terminal PX, which has been higher than the potential at the ground terminal E, becomes lower than the potential at the ground terminal. E, the output signal having a logical high level H is output from the output terminal of the comparator 31d. The output signal having the logical high level H turns on the first transistor 31e, thus turning on the second transistor 31g. This results in power being supplied from the power-source capacitor 31b to the gate of the lower-arm switch Sn via the second transistor 31g and the third terminal T3. This turns on the lower-arm switch Sn.

The above on-off operations of the lower-arm switch Sn and the on-off operations of the upper-arm switch Sp illustrated in FIG. 4 enable the usual synchronous rectification to be carried out.

Next, the following describes the load-dump protection task carried out by the lower-arm control circuit 31A upon the occurrence of load dump.

When the phase voltage VP, which is input via the first terminal T1 to the cathode of the Zener diode 31i, becomes higher than the Zener voltage, i.e. the allowable upper limit voltage, VLDH, a current flows based on the phase voltage VP into the base of the fourth transistor 31m to thereby turn on the fourth transistor 31m while the adjustment capacitor 31l is charged. This results in a current flowing from the power-source capacitor 31b to the base of each of the fifth and sixth transistors 31p and 31q, thus turning on the fifth and sixth transistors 31p and 31q. That is, when the phase voltage VP is higher than the Zener voltage VLDH, the fourth and sixth transistors 31m and 31q are both in the on state. The on state of both the fourth and sixth transistors 31m and 31q matches with the ONhold flag being set, i.e. having the high level.

Turning on the fifth transistor 31p causes the voltage across the power-source capacitor 31b to be applied to the gate of the lower-arm switch Sn via the fifth transistor 31p and the third terminal T3. This turns on the lower-arm switch Sn after the predetermined time t0 has elapsed since the phase voltage VP exceeded the allowable upper limit voltage VLDH. This clamps the output terminal of the X-phase winding 11X to the potential at the ground GND, thus performing the load-dump protection task.

When the phase voltage VP, which has exceeded the Zener voltage VLDH, becomes negative, the logical level of the output signal from the comparator 31d is reversed from the logical high level H to the logical low level L, thus turning on the first transistor 31e. Tuning on the first transistor 31e turns on both the second and third transistors 31g and 31g. Turning on both the second and third transistors 31g and 31g reduces the base-emitter voltage of each of the fifth and sixth transistors 31p and 31q, resulting in no collector current flowing through the sixth transistor 31q. This causes the charge stored in the adjustment capacitor 811 to be discharged, thus turning off the fourth transistor 31m. This maintains the fifth and sixth transistors 31p and 31q in the off state, resulting in interruption of the power supply path from the power-source capacitor 31b to the gate of the lower-arm switch Sn. The interruption of the power supply path from the power-source capacitor 31b to the gate of the lower-arm switch Sn matches with the ONhold flag being reset, i.e. having the low level.

Specifically, setting the Zener voltage of the Zener diode 31i to the allowable upper limit voltage VLDH enables determination of whether the first and second load-dump conditions are satisfied according to the phase voltage VP. This is because, as described in the first embodiment, the phase voltage VP being higher than the allowable upper limit voltage VLDH results in the phase voltage VP being higher than the output voltage VB and the output voltage VB being also higher than the allowable upper limit voltage VLDH.

That is, the above power generator 10A according to the second embodiment is configured to compare the phase voltage VP for each of the X-, Y-, and Z-phases with the Zener voltage, i.e. the allowable upper limit voltage, VLDH, and determine whether the first and second load-dump protection conditions are established according to the results of the comparison.

Thus, the power generator 10A according to the second embodiment achieves the advantageous effects that are the same as the power generator 10 does.

Third Embodiment

Next, the following describes a power generator according to the third embodiment of the present disclosure with reference to FIGS. 8A to 8D. The structure and/or functions of the power generator according to the third embodiment differ from the power generator 10 according to the first embodiment in the following points. So, the following mainly describes the different points.

The regulator 14 of the power generator according to the third embodiment performs, in place of the usual field-current control task, a modified field-current control task including field-current reduction while the lower-arm control circuit 31 for each of the X-, Y-, and Z-phases is performing the load-dump protection task.

Figure 8:
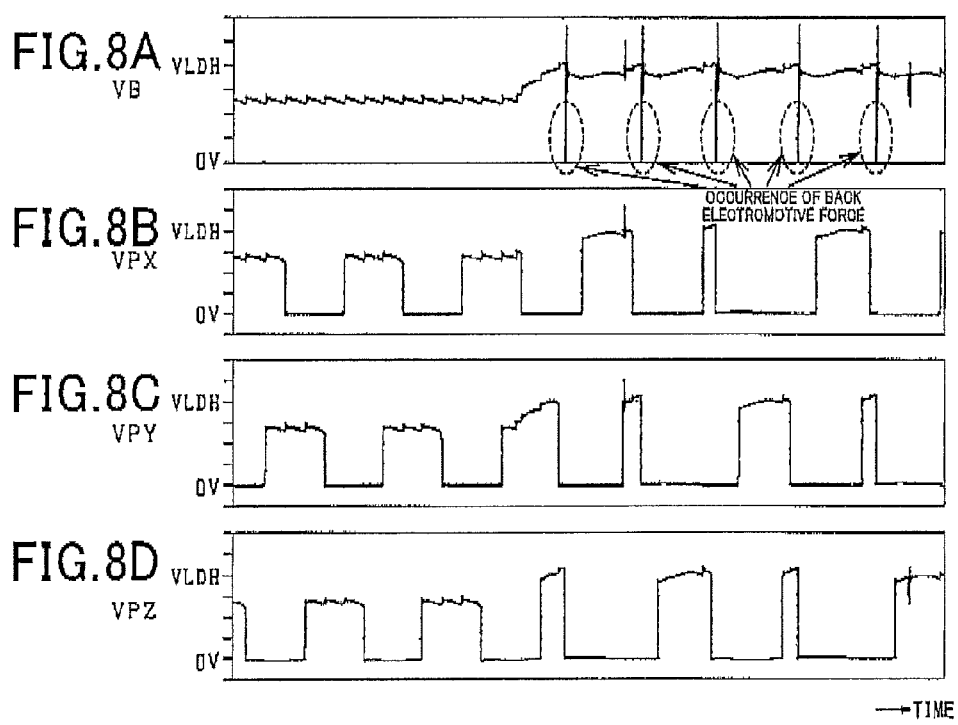
FIGS. 8A to 8D are a joint timing chart schematically illustrating change of the corresponding predetermined electrical parameters of the power generator over time on the basis of the load-dump protection task included in the routine of the on-off task of the lower-arm switch according to the third embodiment of the present disclosure.

Usually, the charge line Lp connecting between the output terminal B and each of the battery 22 and the electrical loads 24 has a considerable inductance. The power generator according to the third embodiment aims to reduce adverse effects due to such a large inductance of the charge line Lp. Specifically, under the charge line Lp having such a considerable inductance and disconnection of, for example, the charge line Lp from the battery 22, performing the load-dump protection task set forth above may result in a high back electromotive force being included in the output voltage VB (see FIG. 8A). In particular, FIG. 8A illustrates how the output voltage VB changes over time under execution of the load-dump protection task. Note that FIGS. 8A to 8D respectively correspond to FIGS. 6A to 6D set forth above.

Users for power generators therefore have requirements to reduce the field current to be supplied to the field winding 12 under execution of the load-dump protection task, thus completing the load-dump protection task for a shorter time. The regulator 14 according to the third embodiment is therefore designed to meet such user' requirements. Specifically, the regulator 14 limits the amount of the field current to be supplied to the field winding 12 using reduction of the output voltage VB due to a back electromotive force generated by the load-dump protection task.

Figure 9:
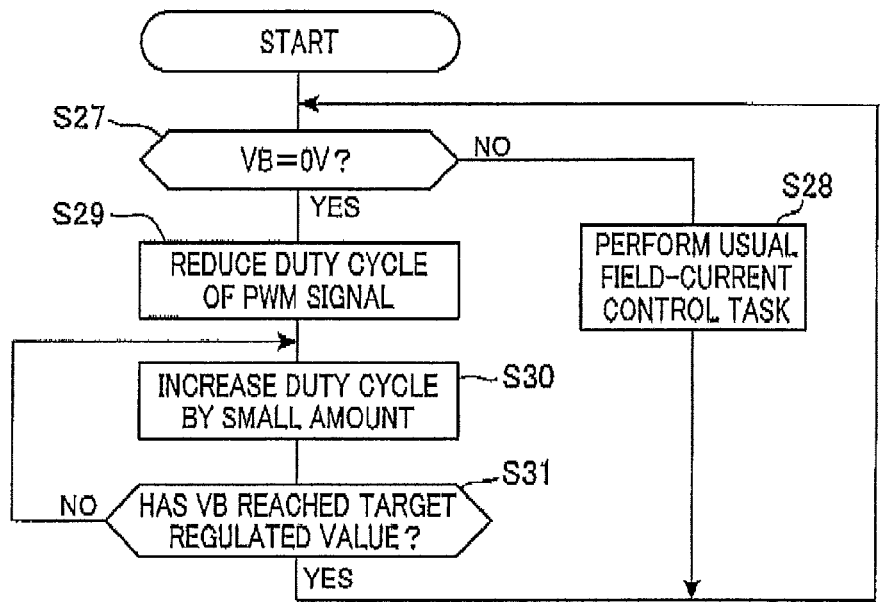
FIG. 9 is a flowchart schematically illustrating the routine of a modified field-current control task including a field-current restraint task cyclically carried out by a regulator according to the third embodiment of the present disclosure.

The following describes the routine of the modified field-current control task including a field-current restraint task cyclically carried out by the regulator 14 with reference to FIG. 9.

When starting the routine of the modified field-current control task, the regulator 14 determines whether the output voltage VB has reached a predetermined low voltage of, for example, 0 V in step S27. The operation in step S27 aims to determine whether the current conditions of the power generator are under the execution of the load-dump protection task. The third embodiment freely determines a value of the predetermined voltage within a low voltage range. For example, the third embodiment freely determines a value of the predetermined voltage within the low voltage range from −1 V to +4 V inclusive, because the output voltage VB usually drops to a voltage within the low voltage range from −1 V to +4 V inclusive immediately after execution of the load-dump protection task.

Upon determining that the output voltage VB has not reached the predetermined low voltage of 0 V (NO in step S27), the regulator 14 performs the usual field-current control task to regulate the output voltage VB to the target voltage received from the ECU 20 in step S28.

Specifically, as described above, the usual field-current control task in step S28 adjusts the duty cycle of the PWM signal according to the results of the comparison between the target voltage and the output voltage VB to control the on-off operations of the switch 14a. This adjusts the level of the field current to be supplied to the at least one field winding 12.

The regulator 14, which has completed the operation in step S28, returns to step S27 and performs the operation in step S27 again.

Otherwise, upon determining that the output voltage VB has reached the predetermined low voltage of 0 V (YES in step S27), the regulator 14 performs the field-current restraint task in step S29.

For example, the regulator 14 according to the third embodiment reduces the duty cycle of the PWM signal down to a predetermined lower value, such as 0, i.e. 0% in step S29. This rapidly reduces the level of the field current supplied to the at least one field winding 12.

Next, in step S30, the regulator 14, which has decreased the duty cycle of the PWM signal down to the predetermined lower value, increases the duty cycle of the PWM signal by a predetermined small amount. The so operations in steps S29 and S30 serve as, for example, the field-current restraint task.

Following the operation in step S30, the regulator 14 determines whether the output voltage VB has reached the target voltage in step S31.

Upon determining that the output voltage VB has not reached the target voltage (NO in step S31), the regulator 14 performs the operation in steps S30 and S31 again. That is the regulator 14 cyclically performs the operations in steps S30 and S31 after execution of the operation in step S29, thus gradually increasing the output voltage VB.

Specifically, upon determining that the output voltage VB has reached the target voltage (YES in step S31), the regulator 14 returns to the operation in step S27, and performs the operation in step S27 again.

The power generator according to the third embodiment restrains the level of the field current to be supplied to the field winding 12 independently of the target voltage during execution of the load-dump protection task (see steps S29 to S31). The power generator according to the third embodiment also shifts from execution of the load-dump protection task to the usual field-current control task according to the results of the comparison between the output voltage VB and the target voltage upon determining the completion of the load-dump protection task (see NO in step S27 and step S28).

The power generator according to the third embodiment therefore achieves an advantageous effect of rapidly restraining the level of the field current to be supplied to the at least one field winding 12 in addition to the advantageous effects that the power generator 10 of the first embodiment does. This enables the load-dump protection task to be switched off faster, thus maintaining the accuracy of controlling the output voltage VB by the regulator 14.

Fourth Embodiment

Figure 10:
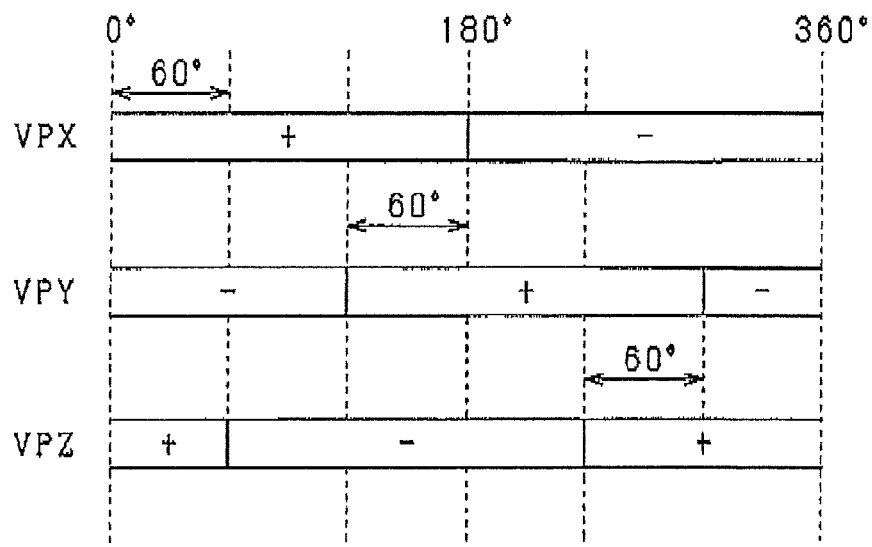
FIG. 10 is a diagram schematically illustrating that first and second phase voltages of first and second phase armature windings in the X-, Y-, and Z-phase armature windings are positive for 60 electrical degrees of one of the first and second phase voltages after one of the first and second phase voltages becomes positive according to the fourth embodiment of the present disclosure.
Figure 11:
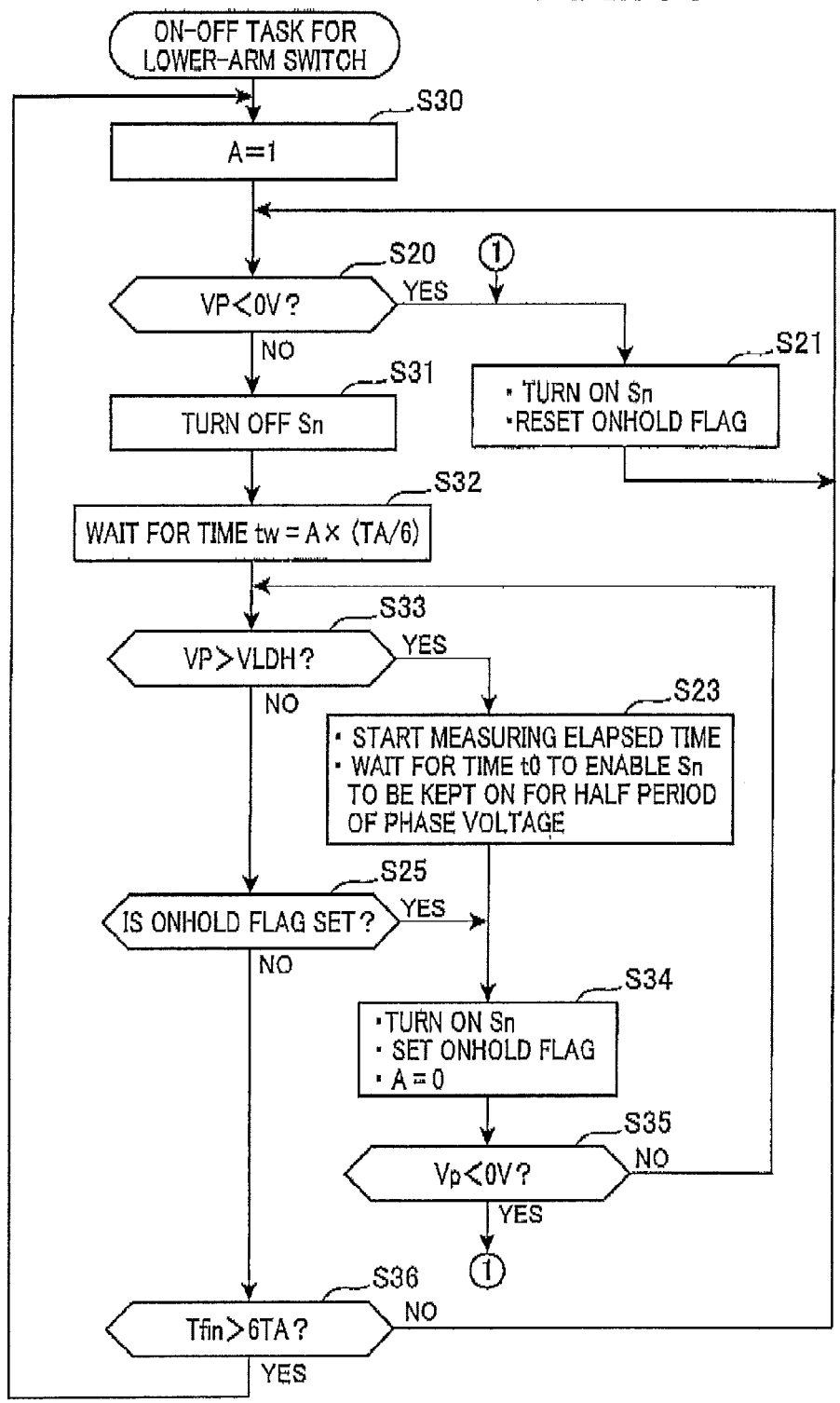
FIG. 11 is a flowchart schematically illustrating the routine of an on-off task of the lower-arm switch according to the fourth embodiment.

Next, the following describes a power generator according to the fourth embodiment of the present disclosure with, reference to FIGS. 10 and 11. The structure and/or functions of the power generator according to the fourth embodiment differ from the power generator 10 according to the first embodiment in the following points. So, the following mainly describes the different points.

The lower-arm control circuit 31 for each of the X-, Y-, and Z-phases of the power generator of the fourth embodiment modifies the load-dump protection task described in the first embodiment. Specifically, the lower-arm control circuit 31 for each of the X-, Y-, and Z-phases disables the load-dump protection task, i.e. turn-on of the lower-arm switch Sn, during a predetermined time for which 60 electrical degrees, in other words, one-sixth of one electrical angular period, i.e. 360 electrical degrees, of the corresponding phase voltage, has elapsed since the shift of the corresponding phase voltage from the negative polarity to the positive polarity even if the phase voltage VP becomes higher than the allowable upper limit voltage VLDH at the occurrence of load dump.

The following describes the reason why to perform the disabling task.

FIG. 10 illustrates that the first and second phase voltages of first and second phase armature windings in the X-, Y-, and Z-phase armature windings 11X, 11Y, and 11Z are positive for 60 electrical degrees of one of the first and second phase voltages after one of the first and second phase voltages becomes positive. In other words, the positive periods of the first and second phase voltages are overlapped for 60 electrical degrees of one of the first and second phase voltages after one of the first and second phase voltages becomes positive.

For example, the X- and Z-phase voltages of the X- and Z-phase armature windings 11X and 11Z are positive during 60 electrical degrees of the X-phase voltage after the X-phase voltage 11X becomes overlappingly positive (see reference character+in FIG. 10). Note that reference character—in FIG. 10 represents that the corresponding phase voltage is negative.

Let us consider the first execution of the load-dump protection task during 60 electrical degrees of, for example, the X-phase voltage across the X-phase armature winding 11X when the X-phase voltage becomes positive at the occurrence of disconnection of the electrical line Lp from the battery 22.

In this case, the operation in step S24 by the lower-arm control circuit 31 for each of the X- and Z-phases turns on the lower-arm switch Sn for a corresponding one of the X- and Z-phases, resulting in the lower-arm switches Sn for the respective X- and Z-phases being in the on state. This increases the period during which no current is flowing from the output terminal B to the electrical loads 24 as compared with the period for a case where the lower-arm switch Sn for one phase is in the on state. This may result in the greater drop of voltage supplied to the electrical loads 24.

To address such a problem, the lower-arm control circuit 31 for each of the X-, Y-, and Z-phases is configured to perform the above disabling task, thus reducing the drop of voltage supplied to the electrical loads 24 during the first execution of the load-dump protection task at the occurrence of load dump.

Next, the following describes the routine of the on-off task of the lower-arm switch Sn, which includes the above disabling task, carried out by the lower-arm control circuit 31 of each of the X-, Y-, and Z-phase rectifier modules 13X, 13Y, and 13Z using FIG. 11. The lower-arm control circuit 31 each of the X-, Y-, and Z-phase rectifier modules 13X, 13Y, and 13Z cyclically performs the routine of the on-off task of the lower-arm switch Sn illustrated in FIG. 11 for the corresponding phase. The following describes simply or eliminates some steps in FIG. 11, which are identical to those in FIG. 5 and have the common step numbers.

When starting the routine of the on-off task of the lower-arm switch Sn, the lower-arm control circuit 31 sets a parameter A to 1 in step S30. Next, the lower-arm control circuit 31 turns off the lower-arm switch Sn or maintains the lower-arm switch Sn in the off state in step S31 when determining that the measured phase voltage VP is equal to or higher than 0 V (NO in step S20).

Following the operation in step S31, the lower-arm control circuit 31 waits for a predetermined overlap time tw after the negative determination in step S20 in step S32. The overlap time tw represents the product of the parameter A and one-sixth of the period TA of the corresponding phase voltage; the overlap time tw is expressed as tw=A×TA/6. That is, when the parameter A is set to 1, the lower-arm control circuit 31 need to wait for the overlap time tw, but when the parameter A is set to 0, the lower-arm control circuit 31 has no need to wait for the overlap time tw, because the overlap time tw is zero.

In other words, the lower-arm control circuit 31 serves as, for example, a disabling unit that continues the off state of the lower-arm switch Sn to thereby disable turn-on of the lower-arm switch Sn during the overlap time tw even if the corresponding phase voltage VP becomes higher than the allowable upper limit voltage VLDH at the occurrence of load dump during the overlap time tw.

The lower-arm control circuit 31, which has waited for the overlap time tw since the negative determination in step S20, determines whether the corresponding phase voltage VP is higher than the allowable upper limit voltage VLDH in step S33. The operation in step S33 corresponds to the operation in step S22 of FIG. 5.

Upon determining that the corresponding phase voltage VP is higher than the allowable upper limit voltage VLDH (YES in step S33), the lower-arm control circuit 31 activates a prepared hardware or software counter Tfin to start measuring, i.e. counting, an elapsed time, and performs the further waiting operation in step S23.

Following the operation in step S23, the lower-arm control circuit 31 performs the load-clump protection task in step S34. Specifically, in step S34, the lower-arm control circuit 31 turns on the lower-arm switch Sn after the predetermined time t0 has elapsed since the affirmative determination in step S22, thus clamping the output terminal of the corresponding armature winding to the potential at the ground GND in step S34.

In step S34, the lower-arm control circuit 31 also sets the ONhold flag therein, and sets the parameter A to zero.

Following the operation in step S34, the lower-arm control circuit 31 determines whether the corresponding phase voltage VP is less than zero in step S35. Upon determining that the corresponding phase voltage VP is less than zero (YES in step S35), the lower-control circuit 31 returns to step S21 and performs the operation in step S21 again. Note that the lower-arm control circuit 31, which has performed the operation in step S21, returns to step S20 and performs the operation in step S20 again.

Otherwise, upon determining that the corresponding phase voltage VP is equal to or higher than zero (NO in step S35), the lower-control circuit 31 returns to step S33 and performs the operation in step S33 again.

In step S33, upon determining that the corresponding phase voltage VP is equal to or lower than the allowable upper limit voltage VLDH (NO in step S33), the lower-arm control circuit 31 performs the operation in step S25. In step S25, the lower-arm control circuit 31 determines whether the on-hold flag ONhold is set. If it is determined that the on-hold flag ONhold is set (YES in step S25), the routine of the on-off task proceeds to step S34 set forth above.

Otherwise, if it is determined that the on-hold flag ONhold is reset (NO in step S25), the routine of the on-off task proceeds to step S36.

In step S36, the lower-arm control circuit 31 determines whether the count value of the counter Tfin, which represents the elapsed time since the first affirmative determination in step S33, has exceeded a threshold time expressed by 6×TA, matching with the six periods of the corresponding phase voltage VP. The operation in step S36 aims to determine whether a load-dump surge has ended.

Specifically, upon determining that the count value of the counter Tfin has not exceeded the threshold time 6×TA (NO in step S36), the lower-arm control circuit 31 returns to step S20, and performs the operation in step S20 and the subsequent operations while the parameter A is kept to zero. This eliminates the need for the lower-arm control circuit 31 to wait for the overlap time tw.

Otherwise, upon determining that the count value of the counter Tfin has exceeded the threshold time 6×TA (YES in step S36), the lower-arm control circuit 31 determines that a load-dump surge has ended, because the phase voltage VP, which is equal to or lower than the allowable upper limit voltage VLDH, has continued for the threshold time 6×TA.

As described above, the power generator according to the fourth embodiment achieves an advantageous effect of reducing the greater drop of voltage supplied to the electrical loads 24 during the first execution of the load-dump protection task at the occurrence of load dump in addition to the advantageous effects that the power generator 10 of the first embodiment does.

The present disclosure is not limited to the aforementioned embodiments, and can be widely modified within the scope of the present disclosure.

Figure 12:
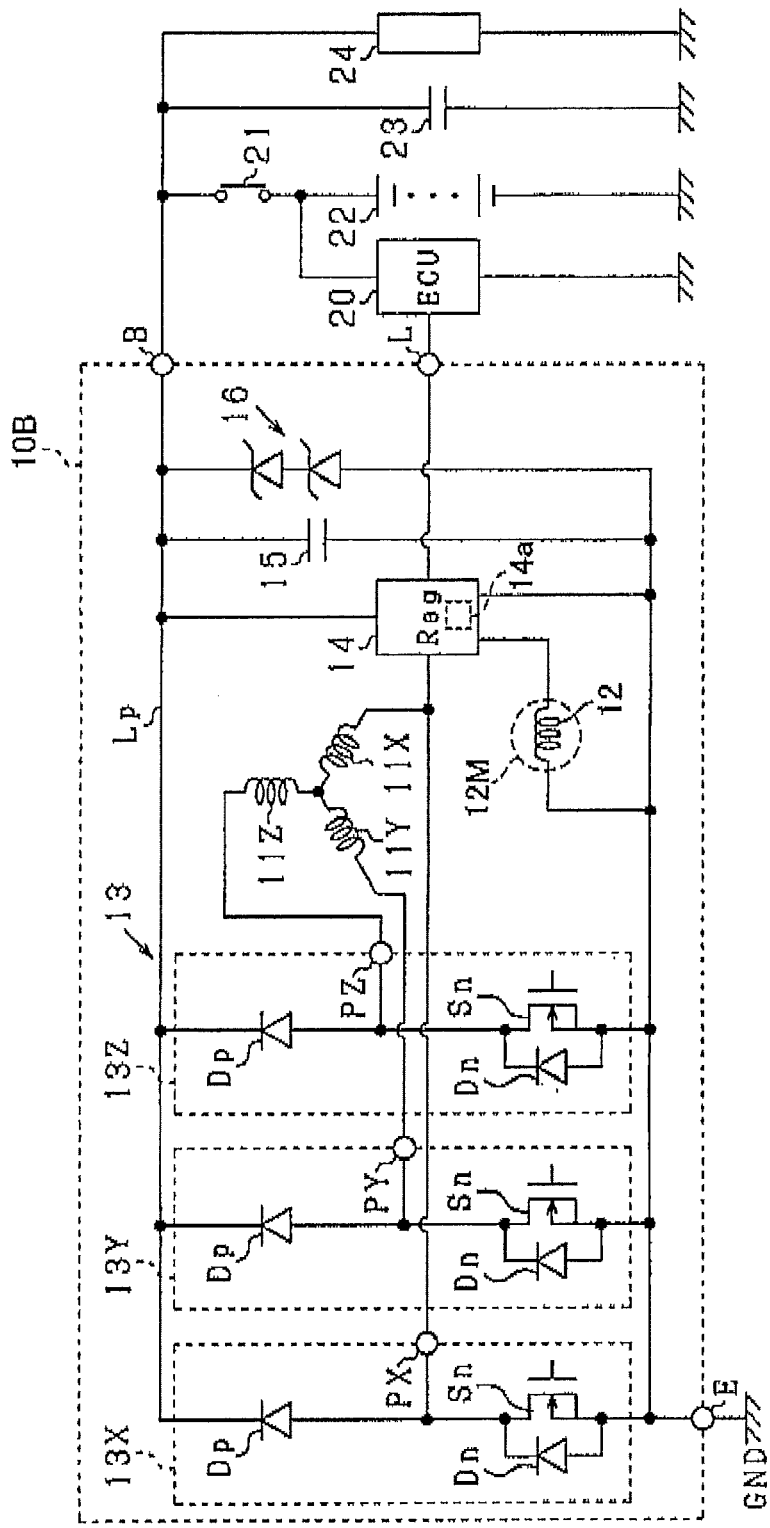
FIG. 12 is a circuit diagram schematically illustrating an example of the structure of a power generator according to a first modification of the first embodiment.

FIG. 12 illustrates an example of the structure of a power generator 103 according to a first modification of the first embodiment of the present disclosure. Referring to FIG. 12, the power generator 103 includes diodes Dp in place of the upper-arm switches Sp for the respective X-, Y-, and Z-phases. The elements illustrated in FIG. 12, which are substantially identical to the elements illustrated in FIG. 1, have the same reference numerals assigned thereto as the reference numerals of the elements illustrated in FIG. 1.

A second modification of the first embodiment includes, in place of the operation in step S20, an operation that determines whether the phase voltage VP is lower than the second threshold voltage that differs from zero. Specifically, the second threshold voltage can be set to a value slightly higher or lower than zero.

Each of the first to fourth embodiments uses the lower-arm switch Sn as a protective switch, and turns on the lower-arm switch Sn if it is determined that load dump has occurred.

In contrast, a third modification of each of the first to fourth embodiments can use the upper-arm switch Sp as a protective switch, and turns on the upper-arm switch Sp if it is determined that load dump has occurred.

Specifically, like step S22, the upper-arm control circuit 30 for each of the X-, Y-, and Z-phases according to the second modification determines whether the output voltage VB or the phase voltage VP is higher than, i.e. has exceeded, the allowable upper limit voltage VLDH.

Upon determining that the output voltage VB or the phase voltage VP is equal to or lower than the allowable upper limit voltage VLDH, the upper-arm control circuit 30 does not perform the load-dump protection task.

Otherwise, upon determining that the output voltage VB or the phase voltage VP is higher than the allowable upper limit voltage VLDH, the upper-arm control circuit 30 for at least one specified phase turns on the upper-arm switch Sp for the at least one specified phase. The at least one specified phase represents that the phase voltage across the corresponding at least one phase winding is negative.

This causes a surge current based on the load-dump surge to be circulated through the on-state upper-arm switching element Sp, thus protecting the electrical loads 24 against the load-dump surge.

Each of the first to fourth embodiments uses the lower-arm switches Sn for all the X-, Y-, and Z-phases as protective switches, but can use one or two lower-arm switch(es) Sn for the corresponding one or two phases as protective switches, and can use the remaining switch(es) as diode(s). Similarly, the second modification uses the upper-arm switches Sp for all the X-, Y-, and Z-phases as protective switches, but can use one or two upper-arm switch(es) Sp for the corresponding one or two phases as protective switches, and can use the remaining switch(es) as diode(s).

Each of the first to fourth embodiments and their modifications uses a three-phase power generator as an example of power generators, but can use an M-phase power generator where M is an integer more than 3. If the fourth embodiment uses an m-phase power generator, the overlap time tw can be expressed as $(180°-360°)/M$.

The first embodiment turns on each of the upper- and lower-arm switches Sp and Sn in its non-saturated region, but can turn on each of the upper- and lower-arm switches Sp and Sn in its saturation region.

The saturation region of a MOSFET represents a specific region in the output characteristics of the MOSFET, which represents the correlations between the drain-source voltage Vds and the drain current Id of the MOSFET. In the specific region, the drain current Id is constant independently of the level of the drain-source voltage Vds.

This modification can substantially achieve the advantageous effects that are the same as the power generator 10 does except for the effect based on the non-saturated region.

The lower-arm control circuit 31 for each of the X-, Y-, and Z-phases according to the first embodiment can eliminate the operation to turn on the lower-arm switch Sn in step S21. This enables the corresponding phase current to be rectified through the corresponding diode Dn.

The waiting time t0 used for the first, third, and fourth embodiments can be established such that the predetermined time t0 enables the predetermined amount of electrical charge to be stored in the power-source capacitor 31b; the predetermined amount of electrical charge stored in the power-source capacitor 31b enables the lower-arm switch Sn to be continuously kept on over a period longer than the half period TA/2 of the AC voltage output from the corresponding armature winding.

The lower-arm control circuit 31 for each of the X-, Y-, and Z-phases according to the fourth embodiment can perform the operation in step 22 illustrated in FIG. 5 in place of the operation in step S33 of FIG. 11.

Each of the first to fourth embodiments and their modifications can use an IGBT as a voltage-controlled switch as each of the upper- and lower-arm switches. Each of the first to fourth embodiments and their modifications can also use a current-controlled switch, such as a bipolar switch, as each of the upper- and lower-arm switches.

Each of the first to fourth embodiments and their modifications uses the star-connected three-phase armature windings 11X, 11Y, and 11Z, but can use delta-connected three-phase armature windings.

Each of the first to fourth embodiments and their modifications can include a power generator including at least two sets of three-phase stator windings and at least two three-phase full-wave rectifiers, each of which is connected to the three-phase stator windings of a corresponding one of the at least two sets. An example of these power generators is disclosed in Japanese Patent Application Publication No. 2012-16158. The disclosure of this Patent Publication is incorporated herein by reference.

This modification can be designed such that load-dump protective switches can be used as the upper- or lower-arm switches of at least one of the at least two three-phase full-wave rectifiers. The power generators according to the first to fourth embodiments and their modifications are installed in a motor vehicle, but can be applicable for various industrial fields.

While the illustrative embodiments of the present disclosure have been described herein, the present disclosure is not limited to the embodiments described herein, but includes any and all embodiments having modifications, omissions, combinations (e.g., of aspects across various embodiments), adaptations and/or alternations as would be appreciated by those in the art based on the present disclosure. The limitations in the claims are to be interpreted broadly based on the language employed in the claims and not limited to examples described in the present specification or during the prosecution of the application, which examples are to be construed as non-exclusive.

The invention claimed is:

1. A power generator comprising:
    multiphase armature windings;
    a rectifier circuit comprising a plurality of upper-arm rectifier elements and a plurality of lower-arm rectifier elements connected in series to the corresponding one of the upper-arm rectifier elements, a connection point between each of the upper-arm rectifier elements and the corresponding one of the lower-arm rectifier elements being connected to the corresponding one of the multiphase armature windings, the rectifier circuit being configured to output a rectified voltage as an output voltage of the rectifier circuit based on an AC phase voltage output from each of the multiphase armature windings, the upper-arm rectifier elements or the lower-arm rectifier elements being each comprised of a protective switch;
    a determiner configured to determine whether:
        the phase voltage output from each of the multiphase armature windings has exceeded a threshold voltage; and
    a turn-on unit configured to turn on at least one of the protective switches as a target protective switch to limit the output voltage of the rectifier circuit to be lower than the threshold voltage when it is determined that:
        the phase voltage output from at least one of the multiphase armature windings corresponding to the at least one of the protective switches has exceeded the threshold voltage.

2. The power generator according to claim 1, further comprising:
    a second determiner configured to determine whether the output voltage of the rectifier circuit is lower than a second threshold voltage after the target protective switch is turned on; and
    a turn-off means configured to turn off the target protective switch when it is determined that the output voltage of the rectifier is lower than the second threshold voltage after the target protective switch is turned on.

3. The power generator according to claim 1, wherein:
    each of the lower-arm rectifier elements is comprised of a protective switch,
    the reference voltage is set to the output voltage of the rectifier circuit, and
    the turn-on unit is configured to turn on at least one of the protective switches as the target protective switch when it is determined that:
        the output voltage of the rectifier circuit is higher than the threshold voltage, and
        the phase voltage output from at least one of the multiphase armature windings corresponding to the at least one of the protective switches has exceeded the output voltage of the rectifier circuit.

4. The power generator according to claim 1, wherein:
    each of the upper-arm rectifier elements is comprised of a protective switch,
    the reference voltage is set to zero, and
    the turn-on unit is configured to turn on at least one of the protective switches as the target protective switch when it is determined that:
        the output voltage of the rectifier circuit is higher than the threshold voltage, and
        the phase voltage output from at least one of the multiphase armature windings corresponding to the at least one of the protective switches has decreased to be lower than zero.

5. The power generator according to claim 1, wherein each of the lower-arm rectifier elements is comprised of a protective switch, the power generator further comprising:
    a plurality of capacitors each provided for the corresponding one of the protective switches and connected to the corresponding one of the multiphase armature windings,
    each of the capacitors being configured to be charged based on the phase voltage output from the corresponding one of the multiphase armature windings upon the phase voltage output from the corresponding one of the multiphase armature windings being positive,
    the turn-on means being configured to turn on at least one of the protective switches as the target protective switch using, as a power source, the corresponding one of the capacitors at a timing when a predetermined time has elapsed since the phase voltage output from the corresponding one of the multiphase armature windings was higher than the output voltage of the rectifier circuit,
    the predetermined time being longer than zero and being set to a time that enables a predetermined amount of electrical charge to be stored in the corresponding one of the capacitors, the predetermined amount of electrical charge stored in the corresponding one of the capacitors enabling the identified target protective switch to be continuously kept on over a period longer than a half period of the phase voltage output from the corresponding one of the multiphase armature windings.

6. The power generator according to claim 2, wherein:
each of the upper-arm rectifier elements is configured to permit a current to pass therethrough upon the phase voltage output from the corresponding one of the multiphase armature windings being positive, and block the passage of the current therethrough while the phase voltage output from the corresponding one of the multiphase armature windings is negative;
each of the lower-arm rectifier elements is comprised of a protective switch; and
the second threshold voltage being set to zero or a value close to zero,
the power generator further comprising:
a second turn-on means configured to turn on each of the protective switches for a period during which the phase voltage output from the corresponding one of the multiphase armature windings is lower than the second threshold voltage.

7. The power generator according to claim 1, wherein:
the multiphase armature windings is N-phase armature windings where N is an integer equal to or more than 3; and
each of the multiphase armature windings has an overlap time defined as a period obtained by:
dividing one electrical angular period of the phase voltage output from the corresponding one of the multiphase armature windings by N to obtain a value, and
subtracting the obtained value from half of the one electrical angular period,
the power generator further comprising:
a disabling means configured to disable the turn-on means from turning on the target protective switch during a predetermined period even if the phase voltage output from at least one of the multiphase armature windings corresponding to the at least one of the protective switches has exceeded the threshold voltage,
the predetermined period being a period for which the overlapping period has elapsed since the phase voltage output from the corresponding one of the multiphase armature windings became positive.

8. The power generator according to claim 1, further comprising:
a field winding through which a field current for adjusting the output voltage of the rectifier circuit flows; and
a current controller configured to:
control the filed current to be supplied to the filed winding such that the output voltage of the rectifier circuit follows a target voltage; and
restrain a level of the field current to be supplied to the field winding upon the output voltage of the rectifier circuit being equal to or lower than a predetermined voltage, the output voltage of the rectifier circuit reaching the predetermined voltage based on the turn-on of the identified target protective switch.

9. The power generator according to claim 1, wherein:
the upper-arm rectifier elements or the lower-arm rectifier elements is each comprised of a voltage-controlled semiconductor switch as the protective switch; and
each of the voltage-controlled semiconductor switches as a corresponding one of upper-arm rectifier elements or the lower-arm rectifier elements has input and output terminals and a non-saturated region,
the non-saturated region of each of the voltage-controlled semiconductor switches representing a specific region in output characteristics of the corresponding voltage-controlled semiconductor switch,
the output characteristics of each of the voltage-controlled semiconductor switches representing correlations between the input and output terminals of the corresponding voltage-controlled semiconductor switches and a current flowing through the input and output terminals thereof,
the turn-on means being configured to turn on the identified target protective switch in the non-saturated region of the identified target protective switch.

* * * * *